United States Patent
Winzinger

(10) Patent No.: US 9,321,229 B2
(45) Date of Patent: *Apr. 26, 2016

(54) ONE-STAR SYSTEM FOR FEEDING AND DISCHARGING CONTAINERS FOR PROCESSING MACHINES

(75) Inventor: Frank Winzinger, Freising (DE)

(73) Assignee: KRONES AG, Neutraubling (DE)

( * ) Notice: Subject to any disclaimer, the term of this patent is extended or adjusted under 35 U.S.C. 154(b) by 209 days.

This patent is subject to a terminal disclaimer.

(21) Appl. No.: 14/232,307

(22) PCT Filed: May 16, 2012

(86) PCT No.: PCT/EP2012/059109
§ 371 (c)(1),
(2), (4) Date: Apr. 25, 2014

(87) PCT Pub. No.: WO2013/007430
PCT Pub. Date: Jan. 17, 2013

(65) Prior Publication Data
US 2014/0232045 A1     Aug. 21, 2014

(30) Foreign Application Priority Data
Jul. 13, 2011    (DE) .................. 10 2011 079 078

(51) Int. Cl.
*B29D 22/00*    (2006.01)
*B29C 49/42*    (2006.01)
(Continued)

(52) U.S. Cl.
CPC ............ *B29D 22/003* (2013.01); *B29C 49/421* (2013.01); *B29C 49/4205* (2013.01);
(Continued)

(58) Field of Classification Search
None
See application file for complete search history.

(56) References Cited

U.S. PATENT DOCUMENTS

| 3,391,656 A | 7/1968 | Schafer |
| 3,415,916 A | 12/1968 | Valyi |

(Continued)

FOREIGN PATENT DOCUMENTS

| AT | 412622 B | 5/2005 |
| CN | 2470243 Y | 1/2002 |

(Continued)

OTHER PUBLICATIONS

International Search Report for PCT/EP2012/059109, dated Nov. 20, 2012.

(Continued)

*Primary Examiner* — Monica Huson
(74) *Attorney, Agent, or Firm* — Marshall, Gerstein & Borun LLP

(57) ABSTRACT

The invention relates to a processing machine having a processing wheel, which is in particular continuously driven, comprising at least one processing station for processing containers; comprising only one star for feeding and removing containers into and out of the processing device, which has at least two gripper elements for feeding containers to be processed to the processing station and for removing the processed containers from the processing station; wherein the processing station has a processing position within the processing station; characterized in that the processing station has at least one processing element processing a container, which is designed so that it can move the fed containers to be processed and/or the processed containers to be removed at least partially out of the processing position and/or into the processing position, in particular in a vertical or horizontal manner.

29 Claims, 18 Drawing Sheets

(51) Int. Cl.
*B65C 9/00* (2006.01)
*B67C 3/22* (2006.01)
*B67C 7/00* (2006.01)
　*B29C 49/06* (2006.01)
　*B29C 49/12* (2006.01)
　*B29C 49/36* (2006.01)
　*B29C 49/58* (2006.01)
　*B29C 35/08* (2006.01)
　*B65G 47/86* (2006.01)

(52) U.S. Cl.
　CPC ............... *B29C49/4289* (2013.01); *B65C 9/00* (2013.01); *B67C 3/22* (2013.01); *B67C 7/004* (2013.01); *B29C 49/06* (2013.01); *B29C 49/12* (2013.01); *B29C 49/36* (2013.01); *B29C 49/4236* (2013.01); *B29C 49/58* (2013.01); *B29C 2035/0822* (2013.01); *B29C 2035/0855* (2013.01); *B29C 2049/4294* (2013.01); *B65G 47/847* (2013.01); *Y02P 70/271* (2015.11)

(56) References Cited

U.S. PATENT DOCUMENTS

| | | | |
|---|---|---|---|
| 3,430,292 | A | 3/1969 | Bauman et al. |
| 3,626,589 | A | 12/1971 | Hansen |
| 3,770,098 | A | 11/1973 | Baugnies |
| 4,005,966 | A | 2/1977 | Nutting |
| 4,165,960 | A | 8/1979 | Lemelson |
| 4,365,950 | A | 12/1982 | Harry et al. |
| 4,768,942 | A | 9/1988 | Sola et al. |
| 4,968,081 | A | 11/1990 | Beight et al. |
| 5,253,911 | A | 10/1993 | Egan et al. |
| 5,598,859 | A | 2/1997 | Kronseder |
| 5,975,881 | A | 11/1999 | Langos et al. |
| 6,076,875 | A | 6/2000 | Neff et al. |
| 6,220,310 | B1 | 4/2001 | Emmer |
| 6,488,884 | B1 | 12/2002 | Daubenbuchel et al. |
| 7,081,222 | B2 | 7/2006 | Gram |
| 7,712,601 | B2 | 5/2010 | Shimomura |
| 2010/0285169 | A1 | 11/2010 | Blochmann |
| 2011/0133369 | A1 | 6/2011 | Martini et al. |
| 2011/0198198 | A1 | 8/2011 | Michel |
| 2012/0260955 | A1* | 10/2012 | Winzinger ......... B29C 49/4205 134/43 |

FOREIGN PATENT DOCUMENTS

| | | | |
|---|---|---|---|
| CN | 101513769 | A | 8/2009 |
| CN | 101885235 | A | 11/2010 |
| DE | 2062283 | A1 | 8/1971 |
| DE | 000002215494 | B2 | 1/1976 |
| DE | 3133341 | A1 | 3/1983 |
| DE | 261117 | | 10/1988 |
| DE | 3730396 | A1 | 3/1989 |
| DE | 3732881 | C2 | 11/1989 |
| DE | 3832566 | A1 | 4/1990 |
| DE | 19654350 | A1 | 6/1998 |
| DE | 19912116 | A1 | 9/2000 |
| DE | 19948474 | A1 | 4/2001 |
| DE | 10054475 | A1 | 5/2001 |
| DE | 19956186 | A1 | 5/2001 |
| DE | 20007429 | U1 | 5/2001 |
| DE | 10065591 | A1 | 9/2002 |
| DE | 10259589 | B3 | 4/2004 |
| DE | 10325693 | A1 | 7/2004 |
| DE | 202005007347 | U1 | 7/2005 |
| DE | 102005008685 | A1 | 9/2006 |
| DE | 102005041929 | A1 | 3/2007 |
| DE | 102006023531 | A1 | 11/2007 |
| DE | 102007037719 | A1 | 2/2008 |
| DE | 102008038781 | A1 | 2/2010 |
| DE | 102008039110 | A1 | 2/2010 |
| DE | 102009006508 | A1 | 7/2010 |
| DE | 60208936 | T3 | 10/2010 |
| DE | 102009020738 | A1 | 11/2010 |
| DE | 102009021792 | A1 | 11/2010 |
| EP | 0679480 | A1 | 11/1995 |
| EP | 0721808 | A1 | 7/1996 |
| EP | 0858963 | A2 | 8/1998 |
| EP | 1060865 | A2 | 12/2000 |
| EP | 1535719 | A1 | 6/2005 |
| EP | 1226017 | B1 | 3/2006 |
| EP | 2008793 | A1 | 12/2008 |
| EP | 2295324 | A1 | 3/2011 |
| EP | 2332846 | A1 | 6/2011 |
| FR | 2700293 | A1 | 7/1994 |
| WO | WO-9323232 | A1 | 11/1993 |
| WO | WO-9630189 | A1 | 10/1996 |
| WO | WO-9822374 | A1 | 5/1998 |
| WO | WO-9851608 | A1 | 11/1998 |
| WO | WO-9947330 | A1 | 9/1999 |
| WO | WO-9962692 | A1 | 12/1999 |
| WO | WO-0126882 | A1 | 4/2001 |
| WO | WO-2007096042 | A1 | 8/2007 |
| WO | WO-2008017485 | A1 | 2/2008 |
| WO | WO-2009144664 | A2 | 12/2009 |
| WO | WO-2010020529 | A2 | 2/2010 |

OTHER PUBLICATIONS

Search report for DE 10 2011 079 078.0, dated Apr. 4, 2012.
International Search Report for PCT/EP2012/058898, dated Aug. 1, 2012.
Search report for EP 12 16 7302, dated Dec. 21, 2012.
Search report for DE 10 2011 079 076.4, dated Apr. 5, 2012.
Search report for DE 10 2011 079 077.2, dated Apr. 19, 2012.
European Search Report for Application No. EP12167302 dated Feb. 25, 2014.
Notification of the First Office Action for application No. 2015042901111960, The State Intellectual Property Office of the People's Republic of China, dated May 5, 2015.
German Search Report for 10 2011 007 280.2, dated Mar. 13, 2012.
European Search Report for EP 12 15 6689, dated Nov. 3, 2014.

* cited by examiner

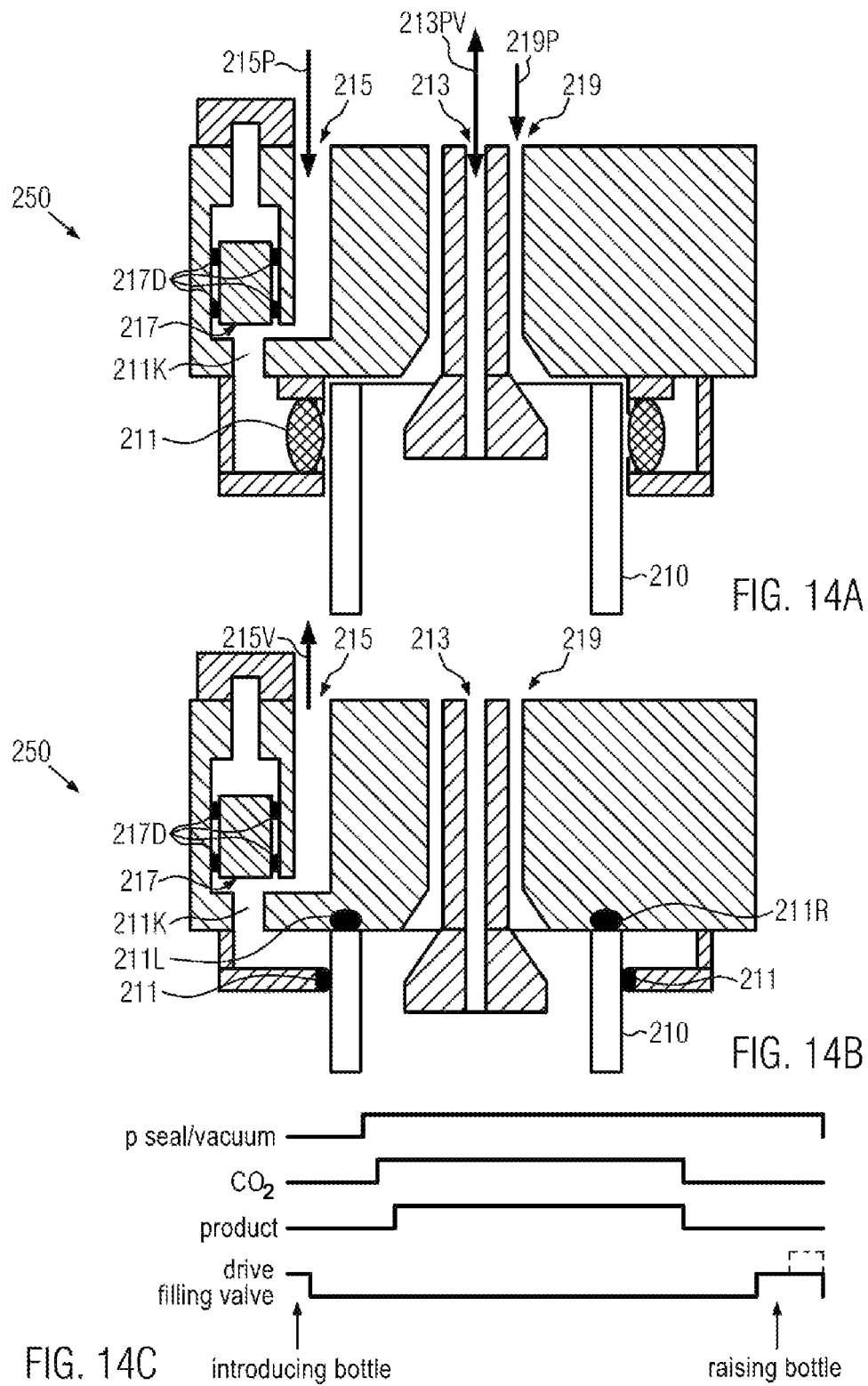

ONE-STAR SYSTEM FOR FEEDING AND DISCHARGING CONTAINERS FOR PROCESSING MACHINES

CROSS-REFERENCE TO RELATED APPLICATION

The present application is the United States national phase of International Patent Application No. PCT/EP2012/059109, filed May 16, 2012, which application claims priority of German Application No. 10 2011 079 078.0, filed Jul. 13, 2011. The priority application is incorporated herein by reference in its entirety.

FIELD OF THE DISCLOSURE

The disclosure relates to a processing device having a processing wheel such as for processing containers and receptacles.

BACKGROUND

Prior art discusses various devices for processing containers/receptacles. A typical example for this is blow-molding containers. In this, a preform, following thermal treatment/preconditioning, is transferred into a blow mold in a blow-molding station, and is there molded to a container by the application of a blowing pressure. A plurality of wheel-like, star-like carrier wheels is typically used as subcarriers. The feed wheels deliver the thermally preconditioned preforms. The preforms are removed from a plurality of processing stations by the feed wheel. After blow molding, the molded containers are again removed by a removal wheel and passed on for further processing.

In such devices, however, the feeding and discharge wheels/stars require a relatively large amount of space. Furthermore, the design complexity for mounting and driving the rotors is significant. In addition, the problem occurs that the feed location and the removal location are stretched relatively far apart, so that a relatively large blind angle is created due to the use of the two wheels. In this region, practically no processing or production can occur. Accordingly, this blind angle limits the number of receiving options and thereby of the processing stations at such a device, so that its system output is reduced.

The system output correlates inter alia with the diameter of the processing wheel. Larger and therefore more expensive diameters are possibly resorted to in order to be able to provide time necessary for processing. With a larger diameter, the number of processing stations can at the same time possibly be increased. However, such a solution is usually very expensive. Therefore options are searched for with which the processing time is increased while the diameter is as small as possible. DE 103 25 693 A1 discusses a possibility to use only one star for feeding and discharging containers, where different grippers are divided into groups on the common rotor, approximately eight preform grippers and eight bottle grippers, where the grippers of the first group have different trajectories than grippers of the second group, where the trajectories of the respective group are complex.

SUMMARY OF THE DISCLOSURE

Given the problems discussed in prior art, it is one aspect of the present disclosure to increase the processing time at the smallest possible diameter of the processing wheel and also to provide a robust option for processing containers.

To accomplish this, the disclosure provides a processing device having a processing wheel which is in particular continuously driven, having at least one processing station for processing containers, having only one star for feeding and removing containers into and out of the processing device, which has at least two gripper elements for feeding containers to be processed to the processing station and for removing the processed containers from the processing station; wherein the processing station comprises a processing position within the processing station.

There is also corresponding method for processing containers with a processing device having a processing wheel which is in particular continuously driven, comprising at least one processing station for processing containers, comprising only one star for feeding and removing containers into and out of the processing device, wherein the star has at least two gripper elements for feeding containers to be processed to the processing station and for removing the processed containers from the processing station; wherein the processing station comprises a processing position within the processing station.

The terms container and receptacle are below used synonymously. Containers or receptacles are in this context understood to be containers, such as bottles, preforms and fully blow-molded bottles, but also glass bottles or other types of containers that can serve to receive liquids, in particular beverages, in which liquids can be packaged, sealed and transported.

The only one star is a star for feeding and removing containers and is also referred to as feed and removal star.

The disclosure provides a processing device having a processing wheel which is in particular continuously driven, comprising at least one processing station for processing containers; comprising only one star for feeding and removing containers into and out of the processing device, which has at least two gripper elements for feeding containers to be processed to the processing station and for removing the processed containers from the processing station, wherein the processing station comprises a processing position within the processing station; wherein the processing station has at least one processing element processing containers which is designed such that it can move the fed containers to be processed and/or the processed containers to be removed at least partially out of the processing position and/or into the processing position, in particular in a vertical or horizontal manner.

The vertical motion of the containers can in particular in the area of transfer or reception create space for feeding or removing another container processed or to be processed of the same processing station.

In the processing device described above, it is therefore the processing element in the processing station that can receive the containers/receptacles processed and/or to be processed and can, in particular in terms of the height, move them upwardly or downwardly or raise or lower the container, respectively. In this, feeding and removing can be performed substantially parallel, i.e. substantially at the same time or temporally shortly offset from one another. The containers to be processed and the processed containers can thereby be transported substantially by the at least two gripper elements, i.e. towards the processing station, respectively, into the processing element of the processing station, and out of the processing element of the processing station, i.e. away from the processing station. Transport paths can typically also arise within or in the vicinity of the processing element. They can be both horizontal, i.e. substantially parallel to the plane of the processing wheel, as well as vertical, i.e. substantially perpendicular to the plane of the processing wheel. In this, the processing element can move the containers.

In the processing device as described above, the processing element can comprise a drive, wherein the drive of the processing element is used for movement of the containers.

Due to the fact that movement of the containers is performed in the vertical direction by the processing element itself, one can therefore use the features already present at the processing element for processing the containers and the drives of the processing element in order to therewith grip and move the containers. The features can be, for example, compressed air application or vacuum application.

In the processing device as described above, the processing element can perform a pneumatic process for the container using a pneumatic device, wherein the pneumatic device controls affixing the containers to the processing element.

During normal operation of the processing device as described above, pneumatic processing of the containers can therefore be effected. This can be the use of compressed air for various forms of processing, such as for stretch-blow molding, labeling, filling, or blowing out, i.e. cleaning the containers. In addition, the pneumatic device employed can, for example, also provide for affixing or pinning the containers processed or to be processed onto the processing element.

This means, in particular no additional possibly complex devices are necessary on the only one star that relate to the movement of the containers, in particular in the processing station. In addition, the movements of the containers to be processed and the processed containers within the processing element of the processing station or the processing station can also exhibit horizontal components. These movement components can at least partially also be performed by the processing element.

In the processing device as described above, at least two gripper elements of the star can be arranged substantially in one plane that is substantially parallel to the plane of the processing device, wherein a first gripper element of the at least two gripper elements is associated only with containers to be removed from the processing station and a second of the at least two gripper elements is associated only with containers to be introduced into the processing station.

Individual gripper elements can therefore at least temporarily be associated solely with the processed containers to be removed. Substantially parallel to that, individual gripper elements can at least temporarily be associated solely with the containers to be introduced and processed. The gripper elements for the processed containers to be removed and the gripper elements for the containers to be introduced and processed can be arranged substantially in one plane. This means that the containers to be removed and the container to be introduced are, for example, substantially removed or introduced at the same level, respectively. The gripper elements are, for example, only horizontally offset from each other. The substantially one plane is, for example, a plane that is positioned substantially parallel to the plane of the processing wheel.

In the processing device as described above, at least two gripper elements of the star can be arranged in two vertically offset planes which are each substantially parallel to the plane of the processing device, so that the containers to be processed can be introduced in one of the two vertically offset planes and the processed containers can be removed substantially in the other of the two vertically offset planes.

Thereby, the processed containers can be removed, for example, at a different level than the level at which the containers to be processed are fed. The containers to be processed and the processed containers can be introduced or removed, respectively, substantially one above the other. But it is also possible that the containers processed and to be processed, in addition to the different level, can be introduced or removed, respectively, at different locations also in the horizontal direction. After successful processing, the processing element can move the processed container out of the processing position so that a new container to be processed can be introduced, while the processed container leaves the processing element and ultimately the processing station.

In the processing device as described above, the gripper elements can additionally perform a pivoting motion and/or a telescopically linear motion in a plane that is substantially parallel to the plane of the processing device.

The gripper elements being arranged on the star can there each, for example, be individually pivotable. For this, a gripper element can for instance comprise a pivot joint that can perform a pivoting motion of the gripper element substantially parallel to the plane of the processing device, i.e. the processing wheel. As the plane of the star is typically located parallel to the plane of the processing device, the pivoting motion of the gripper elements is also in a plane parallel to the plane of the feed and removal star. A gripper element can be composed, for example, of a gripper body located on a pivot joint and gripper arms or gripper fingers. They can, for example, clamp a container in a clamping manner, i.e. hold it. A telescopically linear motion is particularly suitable for guiding a container in a plane substantially parallel to the plane of the processing device, i.e., for example, horizontally, onto/into the processing device or the processing element of the processing station of the processing device, respectively, and also to again there remove a processed container, in particular, superposition of a pivoting motion and the telescopic linear motion is suited to allow a gripper to be accompanied along the transport path of the processing station. It is also possible that a gripper element comprises a plurality of gripper arms as subgrippers which branch off in a fork-like manner from a rear gripper element that is typically attached to the pivot joint referred to above.

In the processing device as described above, the gripper elements can additionally be adjusted in height. Height adjustment can be provided either by a separate option for height adjustment or by a ball joint. It allows adjustment of the gripper height, which can be particularly advantageous in terms of adjustment of systems. Aspects of the size of the containers to be processed can likewise be considered, which is particularly important if more than one type of container is to be processed in a machine. In particular the lift of the grippers is adjustable.

In the processing device as described above, the motions of the gripper elements can be controlled using one or more servo motors or magnetically acting linear motors.

In particular, each gripper or subgripper of a gripper piece having a plurality of gripper elements can be controlled by one or more servo motors or magnetically acting linear motors. Control of these one or more motors can, for example, be controlled using a suitable control unit, whereby it is possible to control the system with the aid of an external control system.

In the processing device as described above, the processing element can comprise a device for blow-molding containers, and a blow mold, where, for example, the containers fed and to be processed are preforms.

In such a processing device, the performs fed are molded, for example, with the aid of a blow mold to be, for example, PET bottles. Each of the processing stations is typically provided with a blow mold, against the inner surface of which a preform introduced into the blow mold is typically expanded using compressed air.

In processing device as described above, the processing element of the blow-molding station can comprise a blowing nozzle which can comprise a seal radially enclosing the container at least at its upper end, wherein the blowing nozzle can be designed to affix the container by pressure variation to the processing element, to move the affixed containers and/or to set them down.

In addition to the blow mold, the processing element of the processing station of the device for blow molding can therefore also comprise a blowing nozzle which seals off the preform from the environment and from which the pressure medium for expansion of the preform flows into the latter. For this, the nozzle comprises a seal. The neck finish of the preform can with a seal be sealed radially from the inside, radially from the outside, from above—for example, against its upper edge or against its supporting ring—or at any other arbitrary position to be sealed. The neck finish is here commonly directed upwardly but can also be aligned downwardly.

The nozzle can be configured to affix the container by pressure variation to the blow-molding station, to move the affixed containers and/or to set them down. With negative pressure, in particular vacuum, the containers can be affixed to the blowing nozzle, in particular such that it can be possible to move the containers with the blowing nozzle. This means, the containers affixed to the blowing nozzle follow a motion, for example, a vertical motion of the blowing nozzle. The blowing nozzle is therefore suitable, for example, to suck up, to suck on, or to raise the containers, or by substantially re-establishing ambient pressure, to again set the containers down. It can also be possible to establish a slight positive pressure in order to be able to detach the containers from the blowing nozzle.

In processing device as described above, the processing element of the processing station can comprise a blowing nozzle and a stretching rod, wherein the stretching rod can be formed to affix the containers to the stretching rod using pressure variation, to move the affixed containers and/or to set them down.

The stretching rod, typically being used for stretching the preforms fed and previously thermally conditioned, can also serve to entrain the containers with the motions of the stretching rod. This creates an additional advantage in that the stretching rod is anyway typically intended to perform relatively large motions in terms of stretching so that the motion of the containers affixed to the stretching rod requires virtually no additional distances of the stretching rod. This in turn means, in particular with respect to vertical/axial motions, that the stretching rod in connection with pressure variations can advantageous move the containers. In general, but also in particular for this, the motions of the blowing nozzle and those of the stretching rod can be coupled to each other. In particular, the drive for the stretching rod is then used for the motion of the container.

In addition, the processing element of the processing station in the processing device as described above can comprise a clamping device for gripping the containers. At the blowing nozzle or at the stretching rod as described above, an additional clamping element or gripper element can therefore be attached at the lower end to create an additional clamping effect.

At the blowing device as described above, movable valves for controlling affixing of the containers, in particular by pressure variation, can further be provided at the blowing nozzle or in a valve block arranged in the immediate vicinity of the blowing nozzle.

For example, compressed air can be passed via these valves against a flexible seal arranged at the blowing nozzle that consequently presses the seal against the surface of the container, so that the latter is in frictional and/or positive-fit connection with the blowing nozzle. The drive of the blowing nozzle can thereby move the container. In particular, the seal is not only suitable for moving the container, but also to seal it from the surrounding during the blow-molding process. In particular, both the seal as well as the interior of the container are then connected to the same compressed-air source. This principle is also applicable to other processing devices in which the container is sealed, for example, in a filling device.

In the blowing device as described above, the blow mold being used for blow-molding the containers/the preforms can be an at least three-part blow mold with a base member that can be designed as being stationary relative to the blow-molding station or the blow-molding wheel, respectively.

The blow mold base is typically driven separately in a vertical direction, i.e. parallel to the blowing nozzle, whereas the blow mold side members are moved away laterally from the container when demolding the fully blow-molded container. The vertical movement of the base is commonly necessary in order to be able to extract the container from the blow mold in the horizontal direction, because the base of conventional bottles has undercuts. By a motion of the container prior to removal using the star for feeding and removing containers away from the blow mold base via the blowing nozzle, the drive of the base can also be omitted, since the undercut is so to speak overcome by the blowing nozzle.

In the processing device as described above, the processing station can comprise a filling station for filling containers.

The filling station can typically comprise a rotary filling station for filling containers.

In the processing device as described above, the processing element can comprise a filling valve comprising a seal radially enclosing the container at least at its upper end, wherein the container can be affixed to the filling valve by pressure variation in the filling valve, wherein the affixed container can be moved and/or set down using the filling valve.

In this, a container/a receptacle can be moved with the filling station, the filler. The filling valve of the filling station can cause the containers to be picked up or gripped, for example, using pressure variations. The container is moved, for example, after being picked up by the filling valve using the latter's drive.

In vacuum fillers, sucking-on can occur with negative pressure, while simultaneously using a vacuum duct of the filling station. With counter balance valves, the pressure variation can similarly to the pressure variations of a blow-molding station further be used for moving the containers.

In the filling station, as described above, the processing element can additionally comprise a vacuum pump, wherein the container is additionally by pressure variation in the vacuum pump affixed, moved and/or set down.

In the filling station as described above, the processing element can additionally comprise a clamping device for gripping the containers.

In processing device as described above, the processing station can comprise a labeling station, wherein the processing element comprises a centering bell that is connected to a vacuum pump and/or a clamping device for gripping the containers, such that the containers can be affixed, moved and/or set down.

Similar to the filling station and the blow-molding station, affixing a container to the processing station can presently be achieved by pressure variation and a vertical or horizontal motion of the container can therewith be performed. With a labeling machine, the centering heads can additionally or alternatively be provided with additional gripper elements that can raise the containers prior to feeding a subsequent container. It is also possible to raise and lower not the centering head, but the plate on which the container is commonly positioned during labeling, in order to thereby create space for a new container to be labeled. In particular during labeling with prefabricated sleeve-like labels, this can be advantageous because drives for the container in the vertical direction are frequently here already present for slipping the label over the container. The gripper elements of the feed and removal star are presently commonly a pocket star wheel which introduces the containers in a circulating manner into the machine or removes them from the machine, respectively. In this, the containers are base-supported. Alternatively, however, as described above, a feed and removal star can also be provided which transports the containers in particular with clamps contacting the container in the region of the neck finish. This is particularly advantageous in so-called block systems in which the labeling machine is arranged downstream of the blow-molding machine and upstream of the filling machine.

The disclosure also provides a method for processing containers with a processing device having a processing wheel which is in particular continuously driven, comprising at least one processing station for processing containers; comprising only one star for feeding and removing containers into and out of the processing device; wherein the star has at least two gripper elements for feeding containers to be processed to the processing station and for removing the processed containers from the processing station, wherein the processing station comprises a processing position within the processing station; wherein the method comprises processing a container in the processing element of the processing station as well as removing the processed container from and feeding a container to be processed into the processing element of the star; and moving the fed container to the processing position and/or the container to be removed out of the processing position using the processing element, in particular in a vertical or horizontal direction.

In the method as described above, the processing element can comprise a device for blow-molding containers, as well as a blow mold, wherein the method can comprise the steps of: gripping the container to be processed, for example, a preform, with a gripper element; then blowing a container from an already introduced container to be processed to form a processed container, for example to a bottle; then opening the blow mold and raising the blow-molded container from the opened blow mold using the processing element; then gripping the blow-molded container with a further, second gripper element and introducing the container to be processed, for example, the preform, with a further first gripper element into the opened blow mold; then closing the blow mold around the introduced container to be processed and releasing the blow-molded container from the processing element; then removing the introduced container to be processed from the first gripper element and removing the blow-molded container with the second gripper element.

The method can therefore be implemented, for example, in a blow-molding machine. In the method, blow-molded containers, typically fully blow-molded containers and containers to be newly processed i.e. to be blow-molded, e.g. preforms, can presently therefore be introduced substantially parallel, i.e. at about the same time into the blow-molding station and be removed therefrom. Feeding and removing typically occurs at different levels, as described above. Alternatively, this can also occur laterally offset from one another.

In the method as described above, the processing station can comprise a filling station for filling containers, wherein the method can further comprise the steps of: gripping a container to be processed, for example, a bottle, with a first gripper element; filling an already introduced container to be processed, for example a bottle, with a liquid, for example, a beverage; then raising the filled container using the processing element; gripping the filled container with a further, second gripper element and introducing the container to be processed; then releasing the filled container from the processing element; then removing the introduced container to be processed from the first gripper element and removing the filled container with the second gripper element.

In the method as described above, the processing station can comprise a labeling station, wherein the processing element can comprise a centering bell being connected to a vacuum pump and/or a clamping device for gripping the containers and/or a base plate on which the containers are transported, wherein the method can comprise the steps of: gripping a container to be processed, for example, a bottle, with a first gripper element; labeling an already introduced container to be processed, for example a bottle; raising the labeled container using the processing element; then gripping the labeled container with a further, second gripper element and introducing the container to be processed; then releasing the labeled container from the processing element; then removing of the introduced container to be processed from the first gripper element and removing the labeled container with the second gripper element.

Gripping—as described in the last two paragraphs—in particular for the filling station and the labeling station, can generally also be understood to be transporting, during which the containers are guided along a guide due to lateral contact with a pocket star wheel (as a feed and removal star). In particular, this transporting is base-supported, i.e. so-called base handling.

It is therefore necessary that the containers/receptacles to be processed in a processing device as described above can be raised, lowered, and moved with the processing elements of the processing stations. Movement of the containers by the processing elements can be performed using their already existing drives. Thereby, these motions are largely decoupled from the motions of the feed and removal star and the gripper elements provided thereon.

In general, the processing elements of a processing station can also comprise gripper elements when end-to-end neck handling is desired within the processing device, i.e. transporting the containers alone by holding the neck finish area.

The basic principle of one-star feeding described above can also be transferred to other rotary machines of a filling line. Inter alia, the following can be mentioned: cappers, rinsers, sterilizers for bottles or preforms, plasma coating machines, furnaces for conditioning preforms and the like.

In furnaces for thermal conditioning of preforms, this is in particular possible when they are furnaces having heating cavities allocated to individual preforms. The cavities can also be heating pockets in the interior of which radiant heaters are disposed which heat the preforms, in particular with infrared radiation. Laser energy for heating could presently also be conceivable. Heating cavities can also be resonators within which preforms are heated by use of microwave radiation. When using such cavities, the preforms mounted onto a heating mandrel—as also described for the other machines—can prior to discharge be drawn vertically upwardly out of the cavity. A new preform to be heated is by the feed and removal star substantially simultaneously placed on the upper edge of the cavity with its transport ring or received by a clamp at the cavity. The heating mandrel, from which the processed preform is meanwhile drawn off, then again receives the new unprocessed preform. Depositing or affixing the preform to the cavity can also be performed by an opening and closing motion of the heating chamber itself—like with a blow mold. Like with the other machines, the drive of the heating mandrel already exists and can also be co-used for the vertical motion. When processing the preforms, the method is particularly advantageous since the drive needs to travel less of a lift due to the lower height of the preform (as compared to fully blow-molded bottles). A linear drive is in particular used as a drive for the heating mandrel, preferably comprising a servo drive.

Containers can with the disclosure be processed across more than 300°, preferably more than 330° and more preferably more than 350° of the revolution of a processing machine, in that they remain in a processing position across this angle.

BRIEF DESCRIPTION OF THE DRAWINGS

The disclosure is explained below by way of example using the following figures.

FIG. 14A shows a processing station according to the disclosure for filling containers for a processing device according to the present disclosure.

FIG. 14B shows a representation of a container affixed to a processing station according to FIG. 14A.

FIG. 14C shows a schematic representation of the pressure states in a processing station/filling station according to FIGS. 14A and 14B.

DETAILED DESCRIPTION OF THE PREFERRED EMBODIMENT

Figure 1:
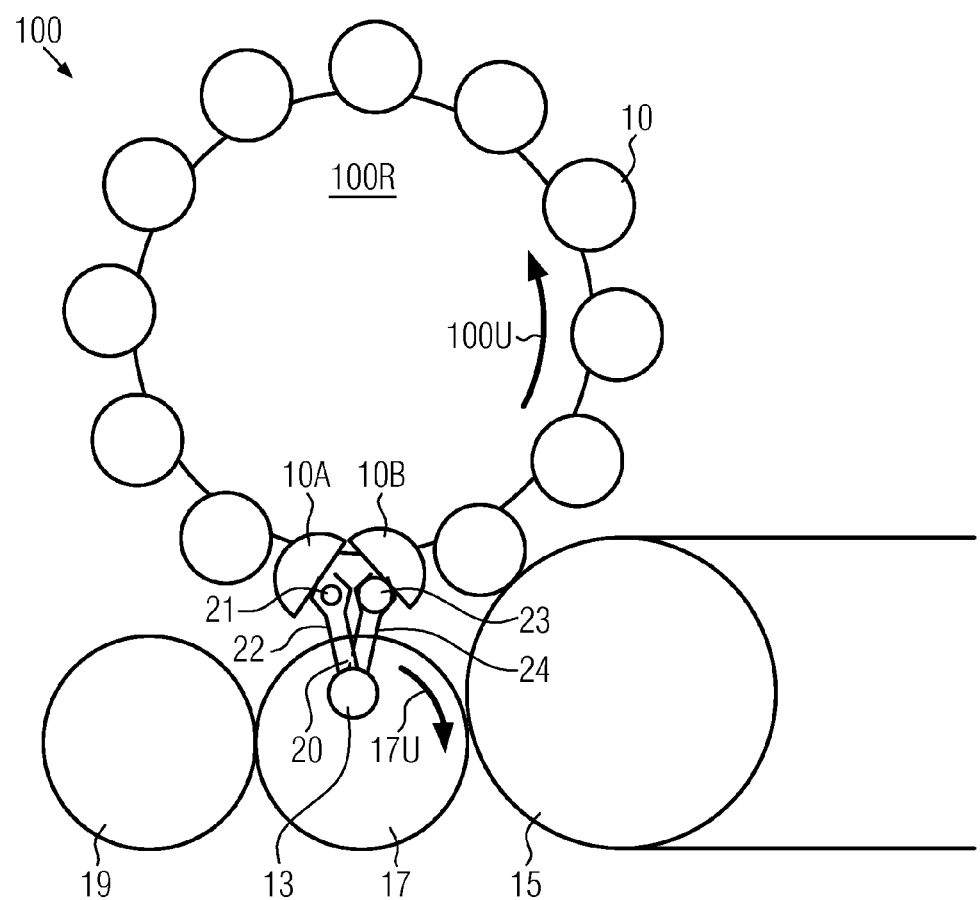
FIG. 1 shows a processing device according to the present disclosure.

FIG. 1 shows an embodiment of a processing device 100 according to the disclosure being designed as a rotary blow-molding machine with a blowing wheel. The processing device 100, drawn purely by way of example, in FIG. 1 bears twelve processing stations 10 that are in the following FIGS. 3B-4A described in more detail. By way of example, a direction of rotation of the processing device 100 with a processing wheel 100R is indicated by arrow 100U. By way of example, one of the processing stations 10 is shown in the unfolded state. In this, containers are fed to or respectively removed from the processing station 10, in particular their halves 10A and 10B, by only one feed and removal star 17, in short referred to as a star. The direction of rotation of the feed and removal star 17 is indicated by arrow 17U. Furthermore, FIG. 1 shows a pre-processing element 15, for example a furnace, for thermal conditioning of containers to be processed before they are taken to a processing station. Furthermore, a processing wheel 19 is shown that can remove containers from the feed and removal star. This involves in particular such containers that have already been processed in the processing device 100.

A gripper element 20 is indicated in FIG. 1 by way of example comprising two gripper arms/gripper finger elements 22 and 24. The gripper finger elements are often in short referred to as gripper elements. Although these gripper elements 22 and 24 are in this example indicated as V-shaped arms branching off from element 20, they can just as well be two completely separate gripper elements. The gripper element 20 is mounted on a pivot member 13 on the feed and removal star 17. The pivoting element 13 enables the gripper arms 22 and/or 24 to pivot in a plane that is typically parallel to the plane of the processing device 100 and thereby is also formed parallel to the plane of the feed and removal star 17. In particular when the gripper arms 22 and 24 are designed separately, they can be attached to a common or individually predetermined pivot element. It is also possible that the pivot element 13 can enable height adjustment of the gripper arms.

It is shown in FIG. 1 by way of example how a blow mold 10 is opened. The blow mold 10 comprises a left half 10A and a right half 10B. The gripper element 20 with its arms 22 and 24 which, as discussed above, can also be formed completely separately, grips container 21 in the blow mold half 10A and container 23 in the blow mold half 10B. Container 21, for example, can be a container to be processed, such as a preform. Accordingly, container 23 can be a blow-molded container, such as a PET bottle.

The motion of the gripper element 20 and its arms 22 and 24 can be effected by a servo motor (presently not shown). Cam control with respective guide rollers is also conceivable. In this case, the cam rollers attached to the gripper arms 22 and 24 follow a fixed curve. The fully blow-molded container 23 was presently moved by the right half of the blow mold 10B during the opening motion, thereby creating space for introducing preform 21. A bracket—not shown—is provided for this at a blow mold 10A, 10B which entrains the container during the opening motion. A clamp could also be provided in a variant at only one blow mold half, into which a preform 21 is introduced. It would also be conceivable to introduce and remove a container 21, 23 in this manner by the same gripper.

Figure 2:
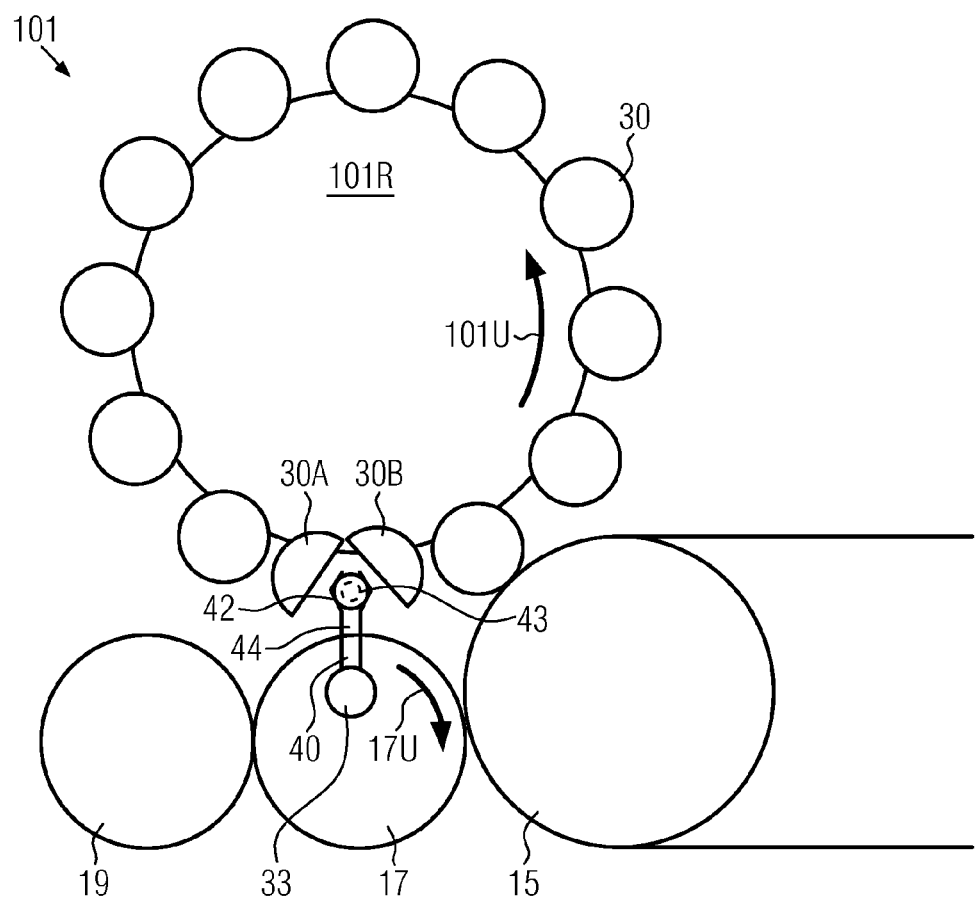
FIG. 2 shows a further embodiment of a processing device according to the present disclosure.

FIG. 2 shows the processing device 101 similar to the processing device/blow molding machine as shown FIG. 3. A plurality of processing stations 30 is again arranged at a processing wheel/blowing wheel 101R. Purely by way of example, there are twelve processing stations arranged in FIG. 2 as well as in FIG. 1. In the region of the feed and removal star 17, a blow mold opened in two halves is again shown at the blowing wheel 101R. The left blow mold half is denoted with reference numeral 30A, the right half is denoted with reference numeral 30B. The direction of rotation of the blowing wheel with the processing stations/blow-molding stations is indicated by arrow 101U. The feed and removal star 17 typically carries a plurality of gripper elements, of which one gripper element 40 is shown by way of example. The gripper element 40, similarly as in FIG. 3 for the gripper element 20, can carry two gripper fingers that are shaped in a fork-like manner. However, these gripper fingers for example 40 are substantially located vertically above each other. A lower gripper element 44 is in the illustration of FIG. 2 therefore covered by an upper gripper arm 42, which is in the figure indicated by a dashed line. The gripper arms 42 and 44 can also be formed completely separately. The gripper element 40 is mounted on a pivot member 33 at the feed and removal star 17. The pivoting element 33 essentially enables pivoting motions of the gripper element 40 and thereby of the gripper arms 42 and 44 in a plane parallel to the feed and removal star 17. It likewise enables a pivot motion of the gripper element 40 or of its gripping arms, respectively, in a plane substantially parallel to the plane of the blowing wheel 101R. It is indicated in the illustration of FIG. 2, that the upper gripper arm 42 removes a container 43 from the open mold halves 30*a* and 30*b* of the blow mold. Container 43, for example, can be a fully processed container. A container introduced for processing is substantially located below container 43 and is therefore not visible in the representation of FIG. 2.

FIG. 2 also shows a preparatory element 15, such as a furnace, which can substantially correspond to preparatory element 15 in FIG. 1. FIG. 2 also shows a further wheel 19 that can receive the processed containers from the feed and removal star 17 for further processing, for example, for labeling and/or filling. The direction of rotation of the feed and removal star 17 is indicated by arrow 17U. In this embodiment, the gripper 40, 42, 44 is formed adjustable in height in order to lower the containers received at a higher level from the blow-molding station 30 to the same height level that corresponds to the transport level of the further wheel 19 or that of the furnace 15. Alternatively, the container could also be lowered in the further wheel 19.

Figures 3A, 3B:
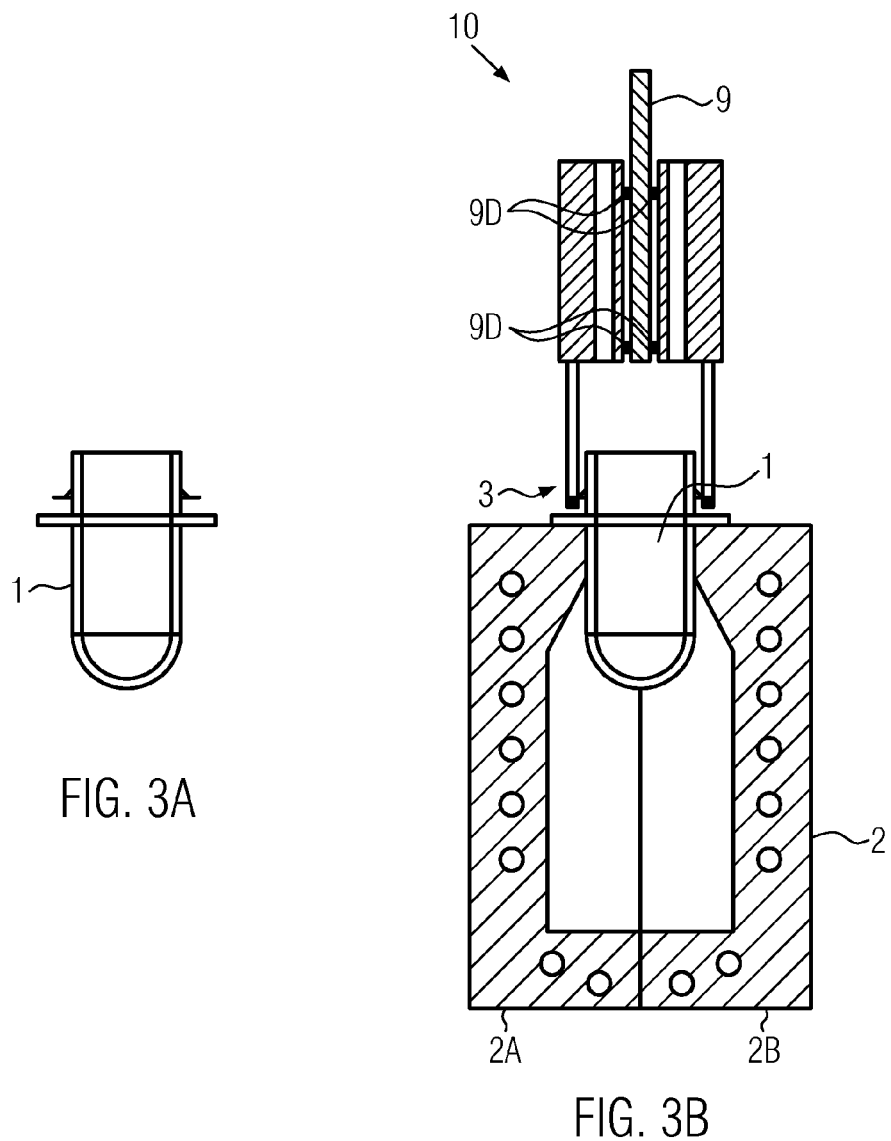
FIG. 3A shows a container that can be processes in a processing device according to FIG. 1 or 2.
FIG. 3B shows a processing station according to the present disclosure.

FIG. 3A shows a preform 1 representing a container/a receptacle as it can be processed in the context of processing devices according to the present disclosure. Preform 1 of FIG. 3A can be affixed to a processing element/a blow-molding station 10, as shown in FIG. 3B. There, the preform can be sealed, for example, with a radial seal 3, so that the compressed air flowing in from the top can blow-mold the preform 1. Preform 1 is thermally preconditioned, for example, using said furnace 15, so that it can be blow-molded. FIG. 3*b* further shows a blow mold 2 that can be used, for example, for blow-molding a container from the preform 1. The blow mold 2 consists, for example, of two halves 2A and 2B. The blow mold 2 can typically be flipped open to remove in particular a blow-molded container from the blow mold. In FIG. 3B, a stretching rod 9 can additionally be used to pre-stretch the container to be molded. The stretching rod 9 can be sealed by a seal 9D.

Figure 4A:
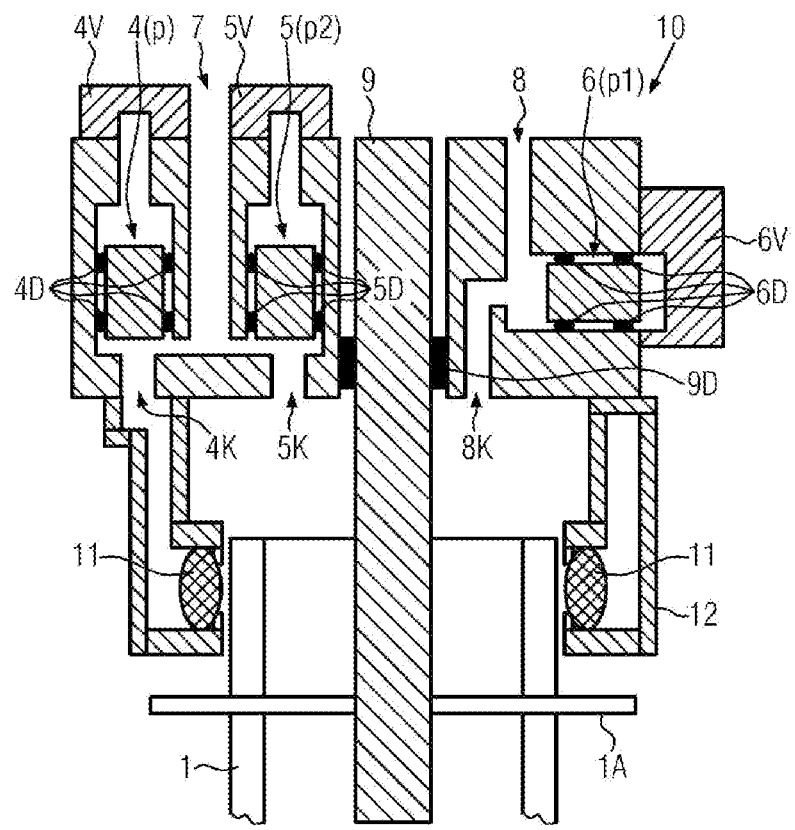
FIG. 4A shows the processing station according to the disclosure of FIG. 3B and the preform of FIG. 3A.

FIG. 4A shows the processing station 10 according to the disclosure of FIG. 3B in more detail, where specifically the blowing nozzle and a valve device are presently visible. Preform 1 has an edge 1A above which it is introduced into the blowing element 10. In the blowing unit 10, movable valves 4, 5 and 6 are also shown. The valves 4, 5 and 6 have their seal elements 4D, 5D and 6D. The valves can each be moved by applying pressure to the pilot valves 4V, 5V, 6V. The plungers of the valves 4, 5, 6 on the side towards the pilot valves typically comprise larger surfaces, so that a pilot pressure as low as possible can be provided. However, illustrating this was omitted for reasons of simplicity. The valves 4, 5, 6 can also be alternatively or additionally controlled electrically. The valves 4, 5, 6 are formed in particular such that they can open or close the supply line for compressed air from ducts 7 and 8 to ducts 4K, 5K, 8K and thereby to the container 1. For example, the pressures P1, low pressure (pilot blowing pressure), as well as P2, the final blowing pressure being necessary for blow-molding can be provided via duct 7 on the left side of the stretching rod 9 and via duct 8 on the right side of the stretching rod 9.

In duct 7, a final blowing pressure of, for example, 40 bars is continuously provided. A blowing pressure is provided of, for example, 15 bar in duct 8.

After placing the blowing nozzle 10 onto the container 1, all valves 4, 5, 6 are initially closed. Valves 6 and 4 are opened first. Valve 6 is switched to pre-blow the container by opening the connection of duct 8 to duct 8K while simultaneously moving the stretching rod 9. Virtually at the same time or slightly prior to that, valve 4 is opened in order to seal the container with the flexible seal 11 towards 4K by opening duct 7.

After a few tenths of a second, valve 6 is again closed and valve 5 is opened to open the flow path from line 7 to line 5K, so that the container can be fully blow-molded by the even greater pressure. After a further few tenths of a second, valve 5 is again closed and by opening valve 6, the compressed air in the container is first partially released into a media storage, such as a compressed air reservoir, is recycled with the pre-blowing pressure, and finally discharged into the environment via a relief valve—presently not shown.

Thereafter, or preferably also during discharge of compressed air into the media storage/into pressure line 8 or into the atmosphere, respectively, the blow mold is unlocked, opened, and the container is raised by the blowing nozzle 10, while valve 4 is still open. Valve 4 is open until the container is gripped by a gripper element of the star, i.e. the feed and removal star. The time period from the time of release to the time of opening the blow mold depends extremely on the container, i.e. the shape of the container and the material of the container and the pressures. With conventional one-way PET bottles, for example, with an average of 0.2 mm wall thickness and with a petaloid base and 10 bar pre-blowing pressure, it would hardly be possible to already open the blow mold during recycling to 10 bar, as otherwise the bottle would be severely deformed. Here it would be suggested to release also the last 1 to 2 bars of positive pressure after opening. But it would also be conceivable to incorporate further recycling stages/valves to also recycle lower pressures. In any case, processing time can be thereby gained.

Figure 4B:
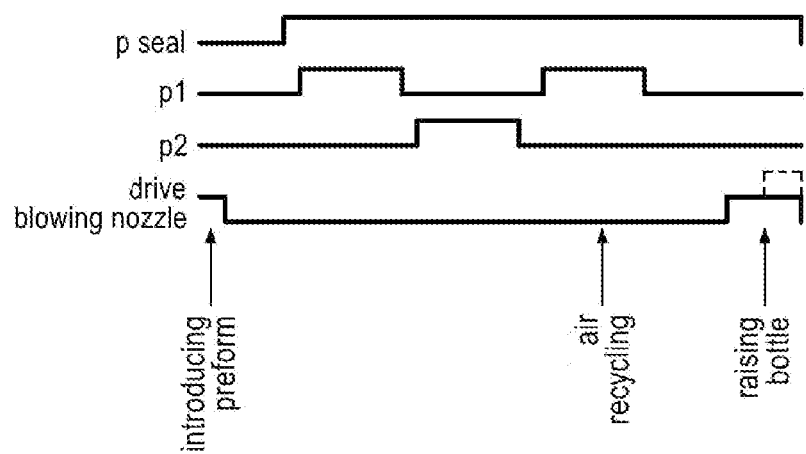
FIG. 4B show a pressure diagram for processing, blow-molding preforms according to the device of FIG. 3A.

FIG. 4B, schematically and without consideration of the actual pressure values, shows the temporal correlation of the pressures applied, where this representation has the time running from the left to the right. The sealing pressure, which can in terms of its value correspond to pressure P2, i.e. the final blowing pressure, is shown in the upper curve. The lower pressure P1 is represented in the curve therebelow. Pressure P2, which can amount, for example, up to 40 bars for completely blowing the container, is represented in the curve therebelow. The lowest of the four curves schematically shows the drive of the blowing nozzle 10. The preform 1 is introduced at the beginning. The upper value of the lowest curve, being denoted with "drive blowing nozzle", indicates the raising and moving. This only occurs almost immediately during introduction and after the container, e.g. a bottle, is to be moved for the purpose of discharge. During the blowing action, the preform or the container being processed, respectively, is located in the blow mold. After about three-quarters of the revolution of a blow-molding station with the blowing wheel, recycling of blow air occurs, as it is applied in many blow-molding stations. During circumferential gripping of the container by the blowing nozzle, further lifting after gripping with the gripper element would need to occur (indicated in phantom in the bottom curve) in order to be able to transport away the container in a horizontal plane. Alternatively, the gripper element is mounted resiliently and adjustably or movable in height, respectively.

Figure 5:
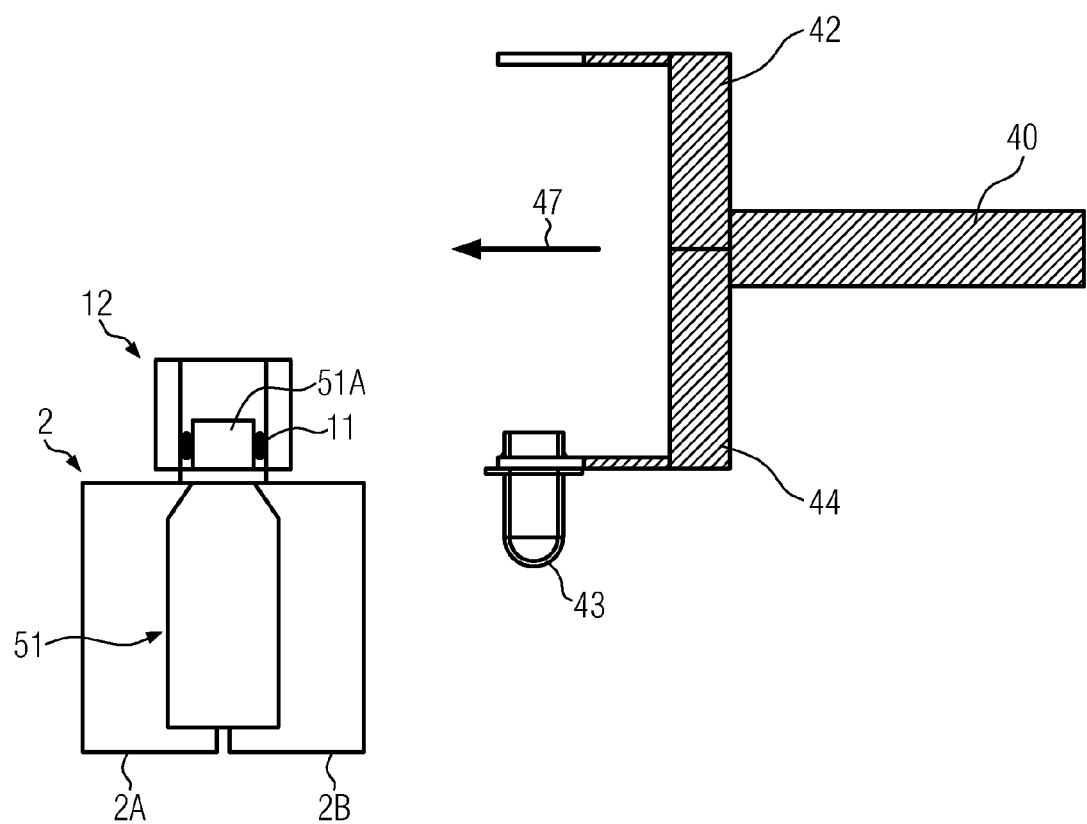
FIG. 5 shows a method step for processing containers with a blow-molding device according to FIG. 2 according to the present disclosure.

Hereafter, FIGS. 5 to 9 show the steps for blow-molding a container with a blow-molding machine as shown, for example, in FIG. 2. FIGS. 5 to 9 each relate to a processing station, for example, a blow-molding station as can be provided at a processing device 101, which is shown in FIG. 2. A gripper element 40 is shown in FIGS. 5 to 9 which is not attached at the feed and removal star 17, not shown in FIGS. 5 to 9. The gripper element 40 comprises two gripper arms 42 and 44. Reference numeral 42 denotes the upper gripper arm. Reference numeral 44 denotes the lower gripper arm. The gripper arms 42 and 44 are in this embodiment arranged at a fixed vertical distance, but can also be driven jointly and/or separately displaceable. A container to be processed, such as a preform, is denoted by reference numeral 43. An already blow-molded container, such as a bottle, is denoted by reference numeral 51. In FIGS. 5 to 9, arrows indicate a horizontal or vertical motion of the elements relative to each other. In FIG. 5, for example, the arrow with reference numeral 47 shows a relative motion of the gripper element 40 with its two arms 42 and 44 relative to the bottle 51 blow-molded in a blow mold. The motion of the gripper is a pivot motion, as is common in rotary machines. The blow mold opens as shown in FIG. 2. It is understood that this figure is merely a schematic representation.

FIG. 5 shows a blow mold 2 with blow mold halves 2A and 2B, as already delineated in FIG. 3B. A container 51, such as a bottle, is shown in the blow mold immediately after termination of blow-molding. The container 51 has an upper portion 51A, such as a neck, which is supported in an annular seal member 11 in a lower part of a blowing nozzle 12. The explanations that have already been discussed in connection with FIGS. 4A and 4B apply for this.

The gripper element 40 in FIG. 5 has only gripped one preform 43 in the lower gripper arm 44 for introducing it. The upper gripper arm 42 in FIG. 5 is still empty.

Figure 6:
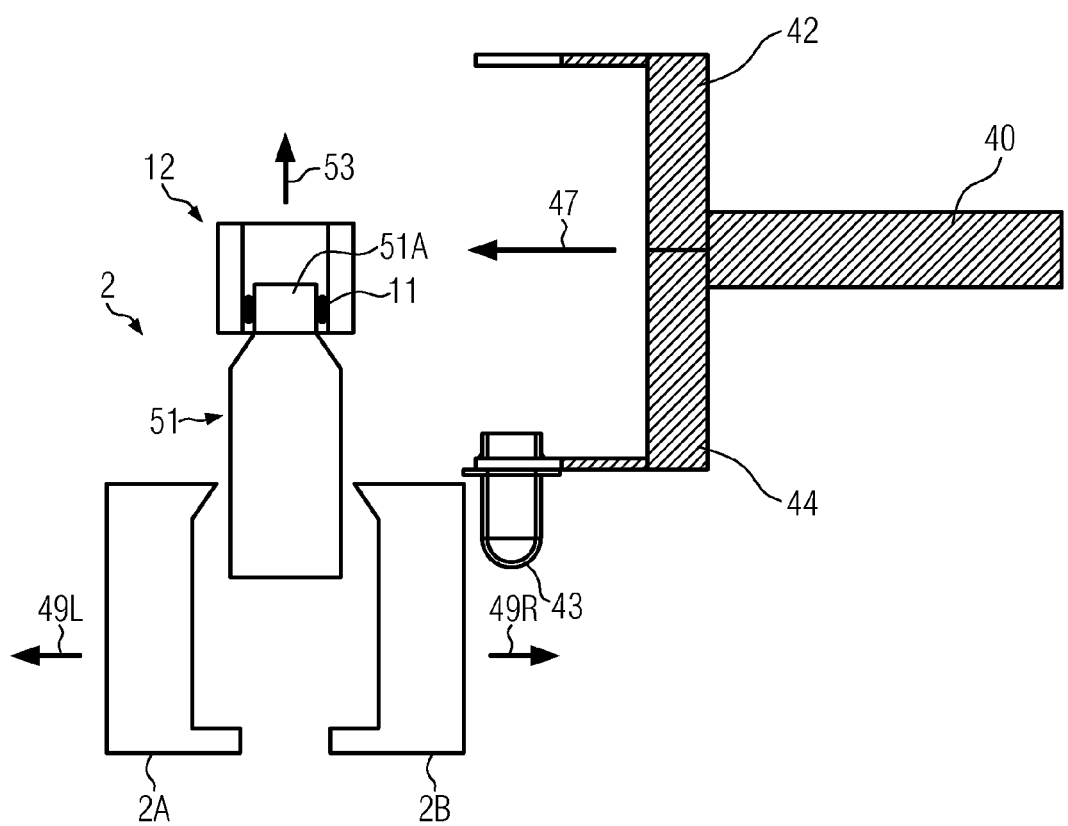
FIG. 6 shows a further method step according to the method for processing containers with a device of FIG. 2 according to the present disclosure.

FIG. 6 shows an immediate next step of the method as being: opening the blow mold 2 (or 30 in FIG. 2), where the blow mold halves 2A and 2B move apart, as indicated by the arrows with reference numerals 49L and 49R. The lower blowing nozzle element 12 moves substantially vertically out from the blow mold. The container 51 being held by the seal 11 is drawn upwardly. In other words, the container 51 follows the motion of the blowing nozzle 12. The elements of the gripper element 40 are provided with the same reference numerals as in FIG. 5. In particular, the container 43 approaches the processing mold. The relative motion of the gripper element and the blow-molding station is further indicated by arrow 47. It is understood that the motion presently being indicated by arrow 53 also entails an upwardly lift. It can in principle also be possible to additionally or alternatively lower the blow mold 2.

In summary, it is shown in FIG. 6 that the blowing nozzle 12 with its seal 11 remains on the container/bottle and draws it along upwardly in a substantially vertical direction as indicated by arrow 53.

Figure 7:
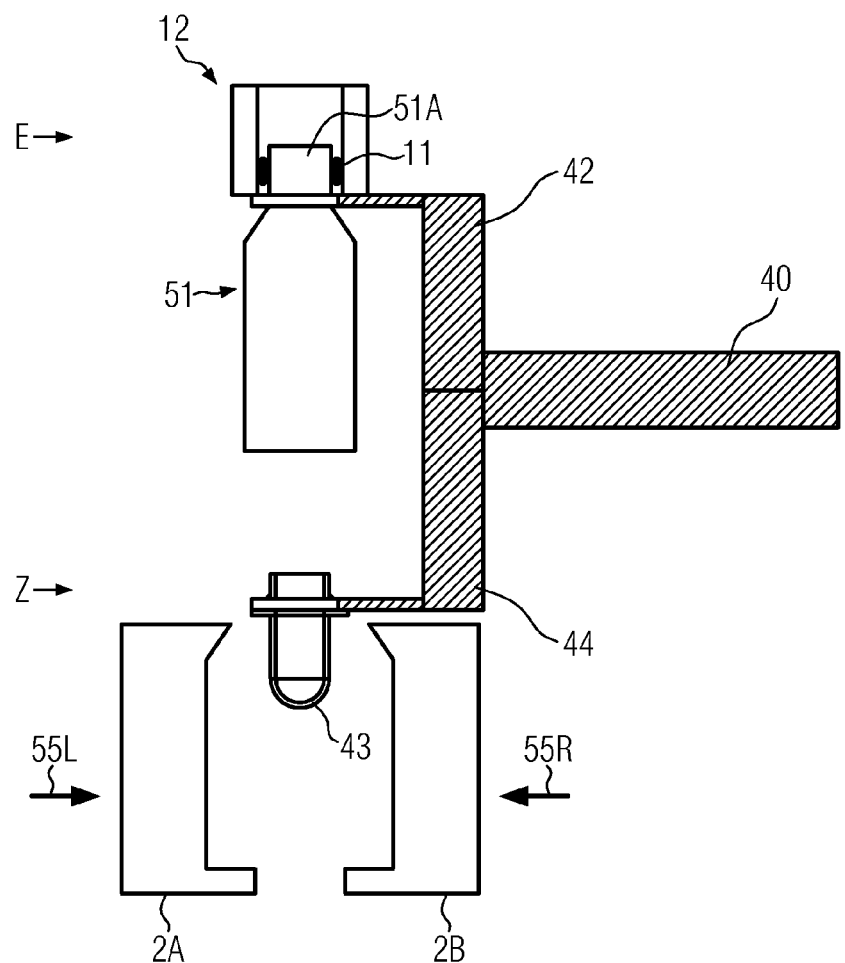
FIG. 7 shows a further subsequent method step for processing containers with a device according to the disclosure according to FIG. 2.

FIG. 7 shows the next step of the method, that the blowing nozzle with its lower portion 12 and the seal 11 as well as the bottle 51 affixed thereto or hanging thereon has reached the removal position. The gripper element 40 with its lower gripper arm 44 and the upper gripper arm 42 has also reached the position of transfer or the position of removal, respectively, of the containers 43 or 51, respectively. The upper gripper arm 42 can grip the container 51 at its upper part, for example, the bottleneck. The lower gripper arm 44 transfers the container 43 to the blow mold of the blow-molding station, i.e. into the processing position. The two blow mold halves 2A and 2B again close for receiving the preform 43. The closing procedure is indicated by arrows 55L and 55R. The motion of the blow mold halves is essentially a horizontal motion. FIG. 7 therefore shows the substantially parallel transfer of the container 43 to the blow mold at a feeding point Z, and substantially parallel thereto, the transfer or the removal of the fully blow-molded container 51 at a transfer point E. It will be appreciated that, depending on device-related or technical specifications, the transfer and removal points Z and E can also be arranged differently, for example, the removal point of the fully blow-molded container 51 can be below the feeding point Z.

Figure 8:
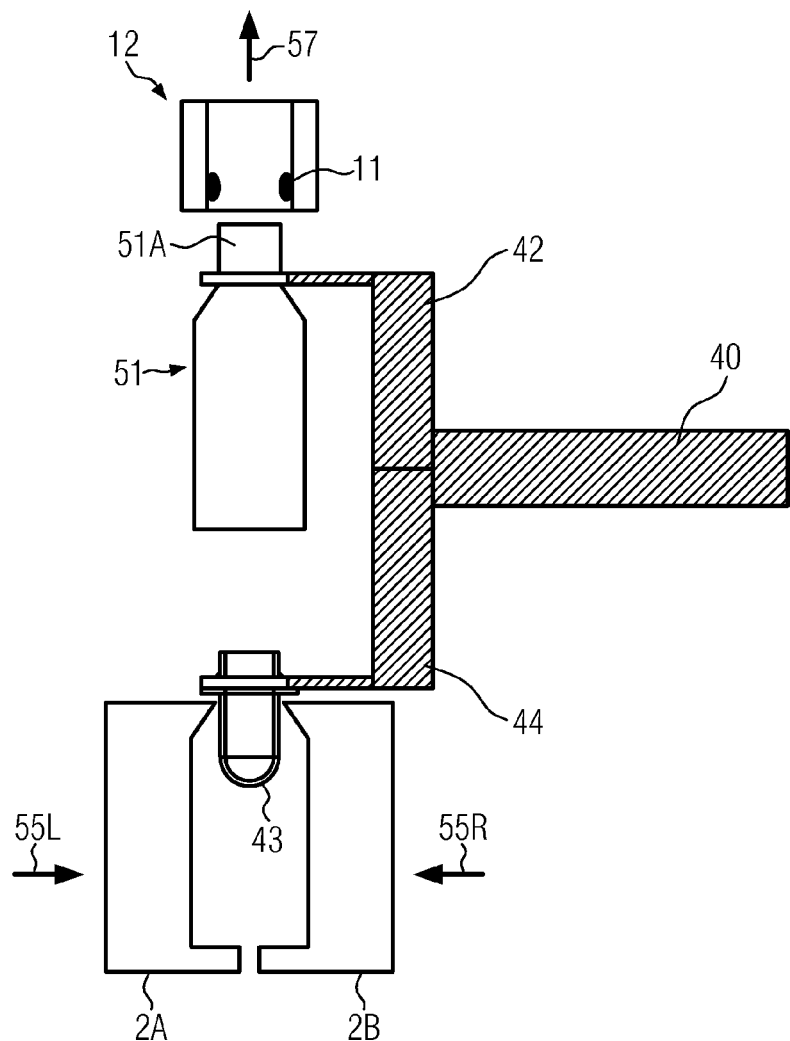
FIG. 8 shows a further subsequent processing step of the method for processing containers with a device according to FIG. 2 according to the present disclosure.

In FIG. 8, a subsequent step of the method is shown, namely how for the upper gripper arm 42, the blowing nozzle 12 with its seal 11 detaches from the upper portion of the fully blow-molded container 51. By way of example, arrow 57 indicates that the blowing nozzle detaches substantially vertically from the upper portion 51A of the container 51. The container 51 is thereby free from the blowing nozzle 12. The container 51 hangs on the gripper arm 42 or is substantially held or gripped only by the gripper arm 42. It is indicated in the lower portion of FIG. 8, that the blow mold halves 2A and 2B are almost completely closed around the preform 43. The direction of movement of the blow mold halves 2A and 2B is again indicated respectively by arrows 55L and 55R. The container 43 is in FIG. 8 still being held and/or gripped by the gripper arm 44 or already released, respectively.

Figure 9:
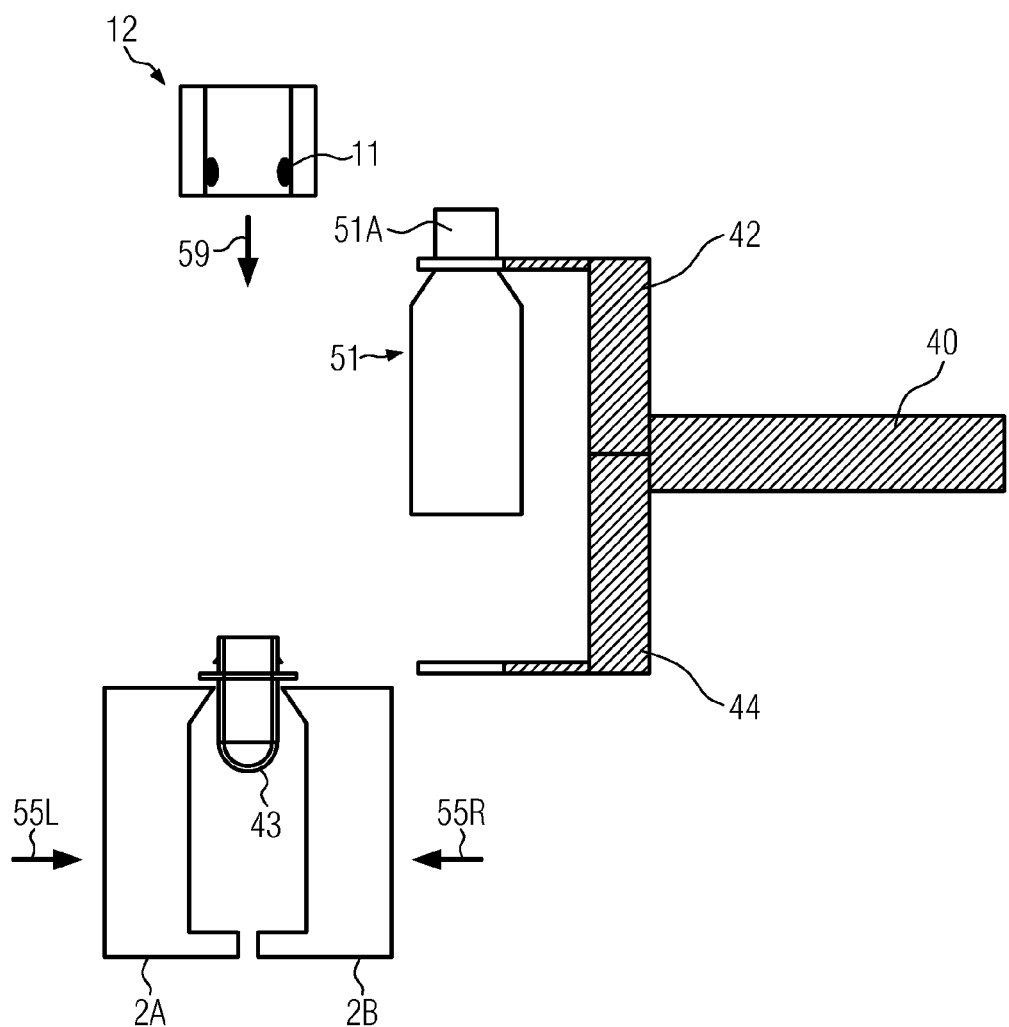
FIG. 9 shows a further subsequent processing step of the method for processing containers with a device according to FIG. 2 according to the present disclosure.

FIG. 9 as the next step shows how the griper element 40 with the gripper arms 42 and 44 and the bottle 51 being gripped with the upper gripper arm 240 is moved substantially horizontally relative to the blow-molding station. The direction of movement is indicated by arrow 61. I.e. the fully blow-molded bottle 51 can in a subsequent step be further transported by the feed and removal star. The latter will associate, for example, another gripper element—presently not shown—to a further blow-molding station—presently not shown—and subsequently again begin with a step as indicated in FIG. 5. FIG. 9 indicates the further preparatory steps with respect to a new cycle of the steps illustrated in FIGS. 5 to 9. Reference numeral 59 indicates the substantially vertical direction of motion of the blowing nozzle 12 of the blow-molding station with its seal 11. It moves relative to the blow mold towards the blow mold. In FIG. 9, this is substantially a vertical downwardly motion. The blow mold with the blow mold halves 2A and 2B has received the preform 43 from the gripper element 44. The blowing nozzle can subsequently—presently not shown—dock to the preform 43 and then blow it to a bottle, as already shown in FIG. 5.

Figure 10:
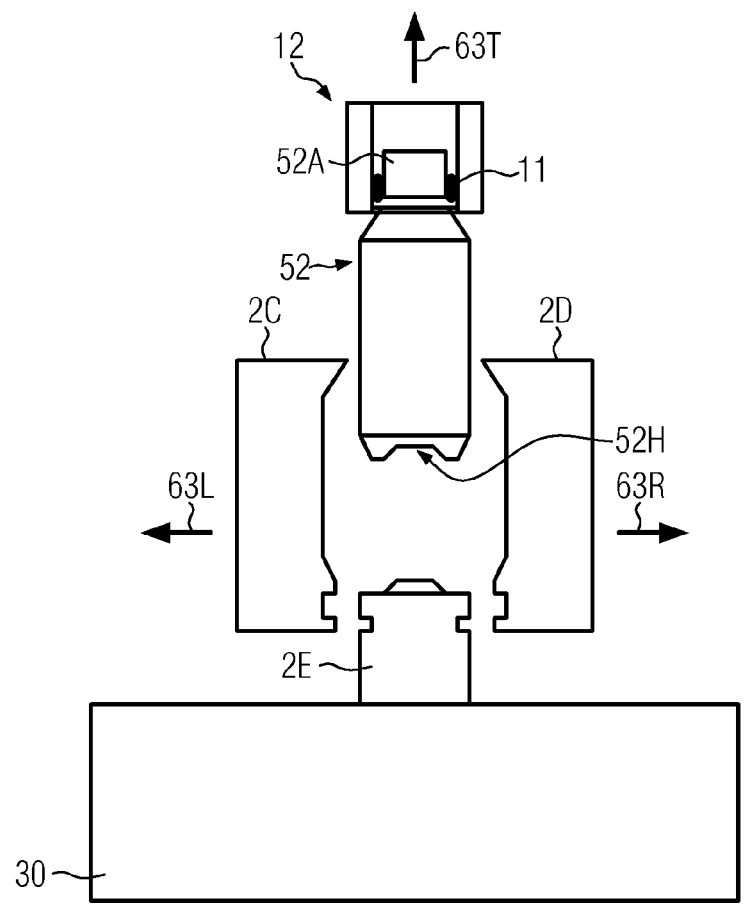
FIG. 10 shows a processing step of the method for processing containers with a device according to FIG. 2, with a three-part blow mold.

FIG. 10 in a further development shows elements within a method, as shown in FIGS. 5 to 9. The bottle 52 with its upper portion 52a is again guided by a blowing nozzle 12 with a substantially radial seal 11. The direction of movement of the blowing nozzle is indicated by arrow 63T. A blow mold in FIG. 10, in addition to the blow mold halves 2C and 2D, i.e. a left and a right blow mold half, has a base member, for example, a base post 2E as a third element of the blow mold. The base member 2E can engage with an undercut 52H of the fully blow-molded bottle 52. The motions of the blow mold halves 2C and 2D relative to the bottle 52 are indicated by arrows 63L and 63R. The fully blow-molded bottle 52 must perform a motion relative to the base member 2E, such as a vertical motion, to be able to detach from the base member. Reference numeral 30 illustrates a substantially stationary base of the blow-molding station 30 as shown in FIG. 2. The mold element 2E, i.e. such as the base post, can be molded or formed substantially stationary onto the base member 30 of the blow-molding station.

Figure 11:
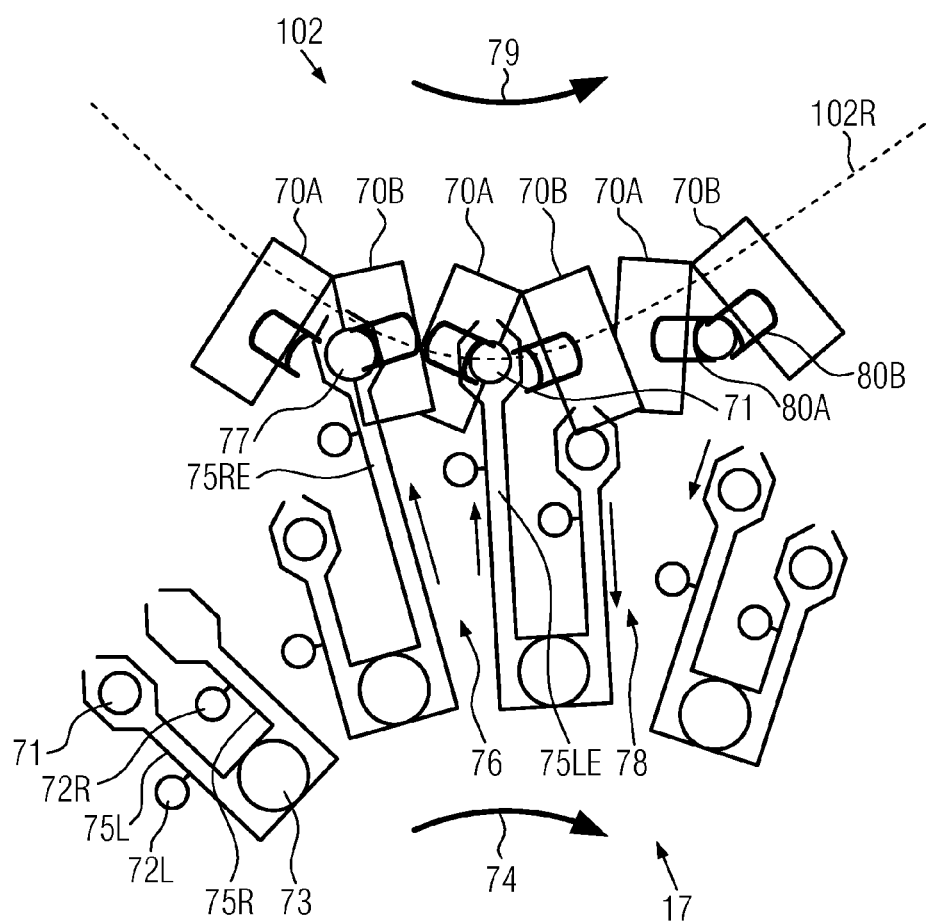
FIG. 11 shows a further development of a processing device within the framework of the present disclosure.

FIG. 11 shows a further development of a processing device 102 with a processing wheel 102R that can correspond to the processing device in FIG. 1. In this, the blow mold halves 70A and 70B are sketched in an unfolded state. The direction of rotation of the blowing wheel 102R is indicated by reference numeral 79. Gripper elements are delineated on a feed and removal star 17 that can correspond to the star 17 as shown in FIG. 1. The direction of movement of the feed and removal star is indicated by arrow 74. A left gripper arm 75L and a right gripper arm 75R are respectively indicated at a pivot joint 73. They can, for example, hold container, such as preforms 71, to feed them to the processing stations with blow molds 70A/70B. Clamps 80A and 80B are additionally drawn in FIG. 11. Clamp 80A is arranged in the blow mold half 70A. Clamp 80B is arranged in the blow mold half 70B. The clamps 80A and 80B can at least partially fix the container to be processed in the blow mold 70, in particular when the blow mold halves 70A and 70B again close or are closed, respectively, as indicated in the right blow mold of FIG. 11. Preferably, the clamps 80A and 80B are resiliently mounted in the direction of the blow mold opening. Alternatively, a clamp 80A, 80B can be arranged on only one of the blow mold halves 70A, 70B. The gripper arms 75L and 75R can comprise guide rollers 72L and 72R with which the motion of the gripper arms can be controlled. A servo motor—not shown—could alternatively also provide for a substantially linear telescopic movement of the gripper arms 75L, 75R. For example, it is shown in FIG. 11 that a gripper arm 75RE removes a fully processed container 77 from a blow mold 70B. The motion of the gripper arm is indicated by arrow 76. It is also shown how the left gripper arm 75L in an extended state 75LE transfers the container 71 to the blow mold 70A. The direction of the return motion of the respective gripper arm is indicated by arrow 78. FIG. 11 therefore essentially shows a development of a processing device/blow-molding machine as indicated in FIG. 1.

Figure 12:
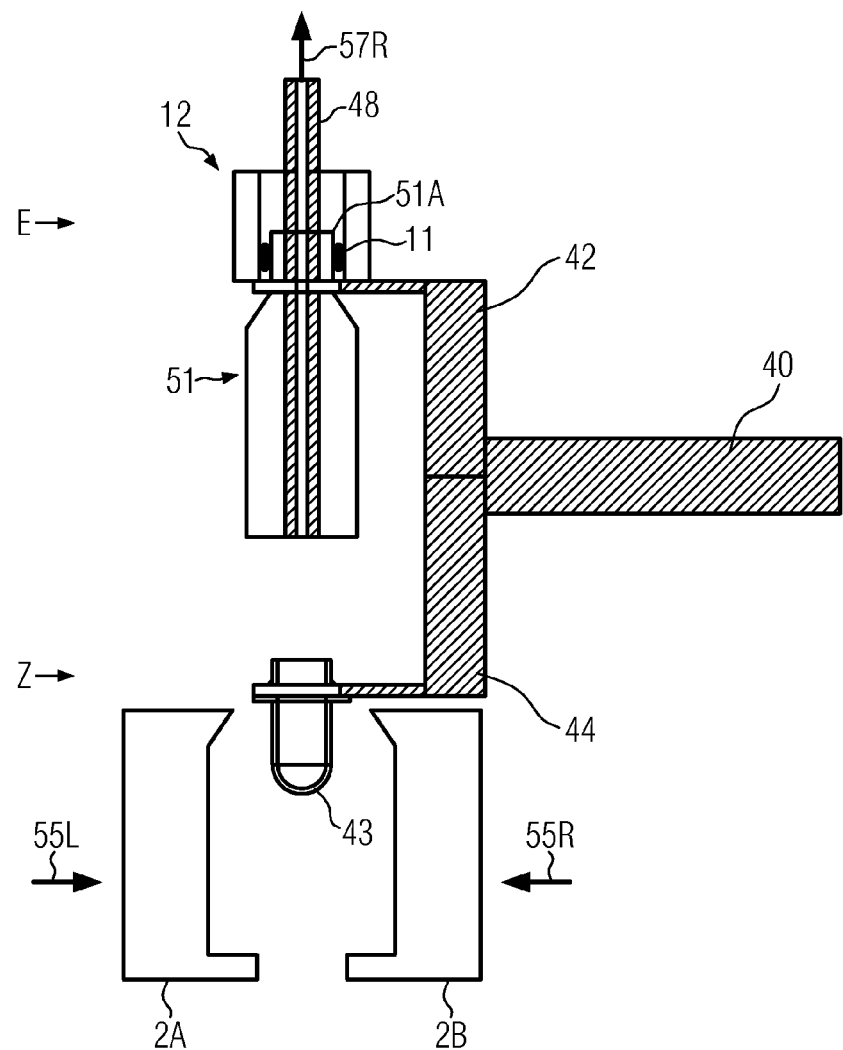
FIG. 12 shows a further development of the device according to the disclosure and the method according to the disclosure for processing containers regarding blow-molding, with a stretching rod.

FIG. 12 shows a further embodiment of a processing device as shown in the context of FIGS. 5 to 9. FIG. 12 has substantially the same elements as given in FIGS. 5 to 9. They are denoted by the same reference numerals and shall presently not be explained again. In addition, FIG. 12 indicates a stretching rod 48. The stretching rod 48 serves to stretch a preform as part of stretch blowing. The stretching rod 48 must perform a lift within the stretching process. Likewise, after stretching, this stretching rod has to be returned to a starting position. The stretching rod 48 can additionally transport the completed container 51. The lift traveled by the stretching rod 48 must by way of design anyway be traveled by the stretching rod. Arrow 57R indicates an upwardly motion of the stretching rod 48. Arrows 55L and 55R indicate the motions of the blow mold halves 2A and 2B.

Figure 13:
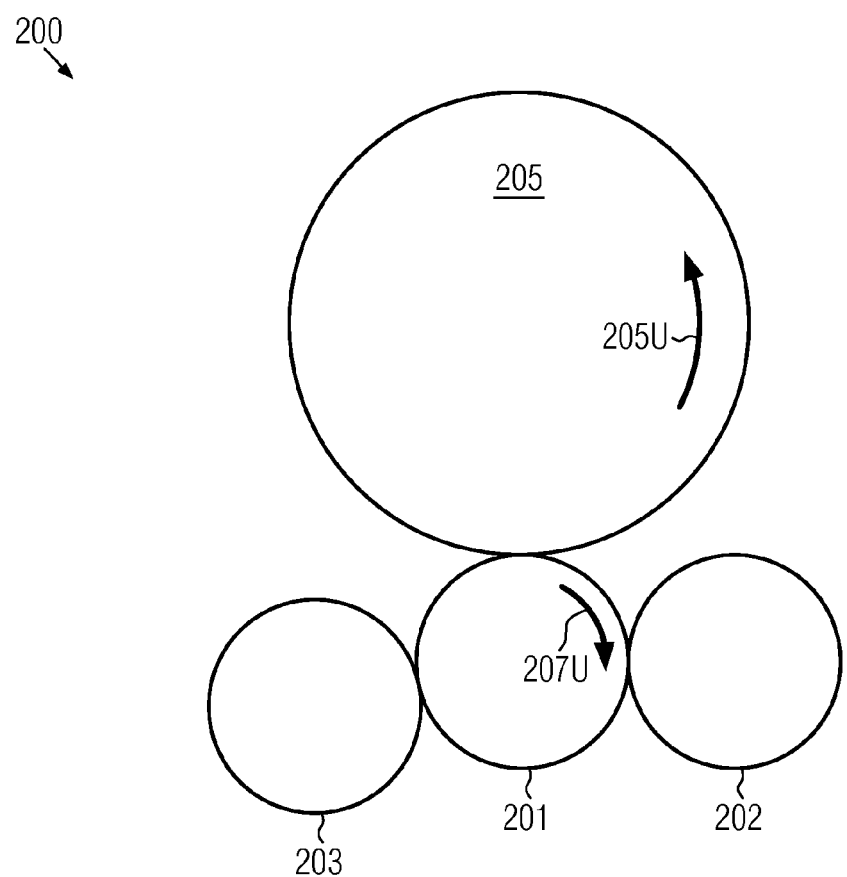
FIG. 13 shows a schematic representation of a further development of a processing device for processing containers in terms of filling containers with filling stations, according to the present disclosure.

FIG. 13 purely schematically indicates elements of a further development of a processing device of the present disclosure. FIG. 13 shows a processing device 200 for filling containers (presently not shown). This processing device 200 is again designed substantially as a rotary machine, similar to the blow-molding device of FIGS. 3 and 4. A direction of rotation of the processing wheel/filling wheel 205 is indicated by arrow 205. A feed and removal star 201 rotates for instance as indicated by the arrow with reference numeral 207. In this, a star 202 can feed containers to be filled, for example, cans, bottles, or receptacles, and a star 203 can remove them from the feed and removal star 201 for further processing. There can be a plurality of filling stations 250 on a processing wheel 205, as described below.

FIGS. 14A to 14C, similar to FIGS. 2A and 2B, show processing of a container, for example, a bottle or a can 210, at a processing element 250 of a filling station. Similar to the blow-molding machine as indicated in FIGS. 2A, 2B, 3, and 3, see also FIGS. 5 tom 9, the container 210 can be fixed by pressure variation, i.e. affixed, and then raised using the processing element. FIG. 14A shows a duct 219. The product can be filled, for example, with a pressure 219P via this duct 219. This product could be, for example, lemonade or cola. A pre-load or a return gas can be filled or extracted using carbon dioxide, $CO_2$, via channel 213, as indicated by the double arrow 213PV. A substantially radial seal with reference numeral 211 is also indicated in FIG. 14A. Furthermore, a valve 217 with a valve seal 217D is indicated. This valve can be moved pneumatically or electrically and can close duct 211K. Sealing pressure for the radial seal can be generated via channel 215. Channel 215 can also be connected to the channel for the $CO_2$-supply, presently not shown. Valve 217 does not necessarily need to be a seat valve, a directional valve could also be used.

FIG. 14B again shows the elements of FIG. 14A, and arrow 215V indicates that a negative pressure, for example a vacuum, is generated with respect to channel 215, whereby the can/the container 210 can in the delineated valve position be held by the seals 211L and 211R.

FIG. 14C, purely schematically and without reflecting the actual pressure magnitudes, shows a time diagram of the pressure states as shown in FIGS. 14A and 14B. Time progresses from the left to the right in FIG. 14C. The top curve being shown in FIG. 14C relates to the sealing pressure or negative pressure, respectively. The $CO_2$ pressure is reflected by the second line from the top. The actual filling is reflected by the third line from the top. The drive of the filling valve with respect to raising and lowering the bottle or the can, respectively, is reflected by the fourth curve, i.e. the lowermost curve. The upper value shown in the fourth curve denotes the lifting or guiding of the container, for example, prior to filling. The lower value of the fourth curve shows a holder of the container in the filling station during the filling process, i.e. in processing position. In the filling station as well, as indicated in FIGS. 14A and 14B, a container, such as a can or a bottle 210, is affixed to the lower end of the processing element 250 of the filling station, such as a filling valve, and can then be moved with the aid of this lower part, for example, in the vertical or horizontal direction. The motions can be similar to the motions as discussed with respect to the blow-molding station in FIGS. 5 to 9. For eliminating the vacuum and removing the container, a second valve—not shown—can also be provided.

Figure 15A:
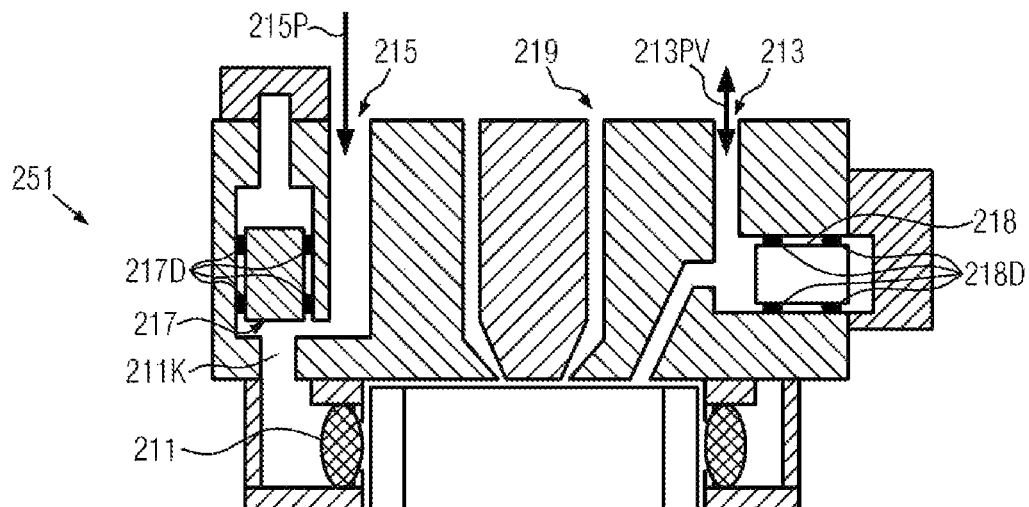
FIG. 15A shows a further development of a processing station/filling station for use of a processing device according to FIG. 13.
Figure 15B:
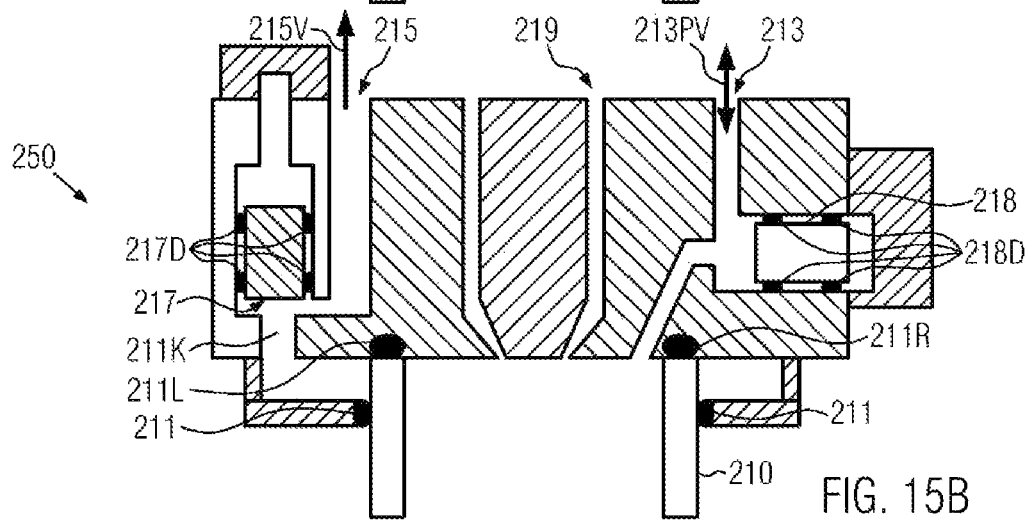
FIG. 15B shows a representation of an affixed container according to the processing station of FIG. 15A.
Figure 15C:
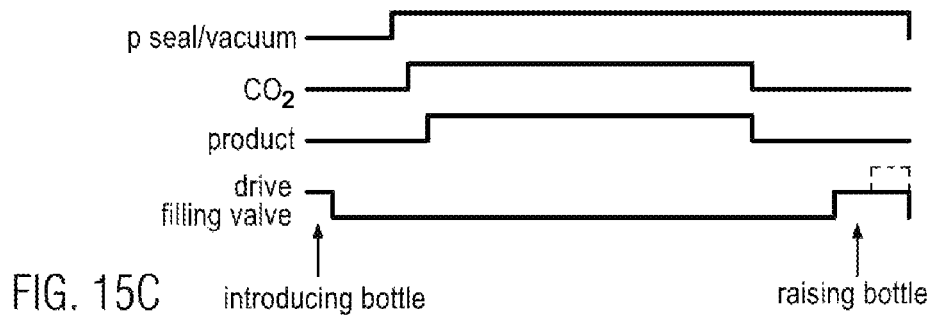
FIG. 15C shows a representation of the pressure states in a processing station/filling station according to FIGS. 15A and 15B.

FIGS. 15A to 15C show a further embodiment of a filling station as shown in FIG. 13. In contrast to FIGS. 14A and 14B, a so-called free flow filler for bottles is indicated in FIG. 15A as a processing element 251. The product, e.g., juice, is fed through the duct 219 into the container 220. Duct 215 corresponds substantially to duct 215 as shown in FIG. 14A. Reference numerals 215P are applied pressure for sealing, i.e. sealing pressure, via this duct onto the seal 211. A movable valve 217 with valve seals 217D is shown. The valve 217 can be actuated pneumatically or electrically. A duct 213 with a filling gas, such as $CO_2$ for flushing or for receiving return gas as indicted by arrow 213PV, is shown in the right half of FIG. 15A. A further movable valve 218 with a valve seal 218D can be moved similarly to valve 217. By actuating valve 218, duct 213K can be closed.

FIG. 15B again shows the state in which negative pressure is generated with the aid of duct 215. The negative-pressure or vacuum seal is indicated by arrow 215V. Reference numeral 211L shows another density [sic] point.

FIG. 15C again shows a qualitative time sequence of the pressure states arising in the processing element, i.e. the filling nozzle/fill valve 251, which is in turn in correspondence with FIGS. 15A and 15B. In this, these pressure states are similar to those that are shown in FIG. 14C. The meanings of the curves shown are also similar to those that are shown in FIG. 14C.

Figure 16:
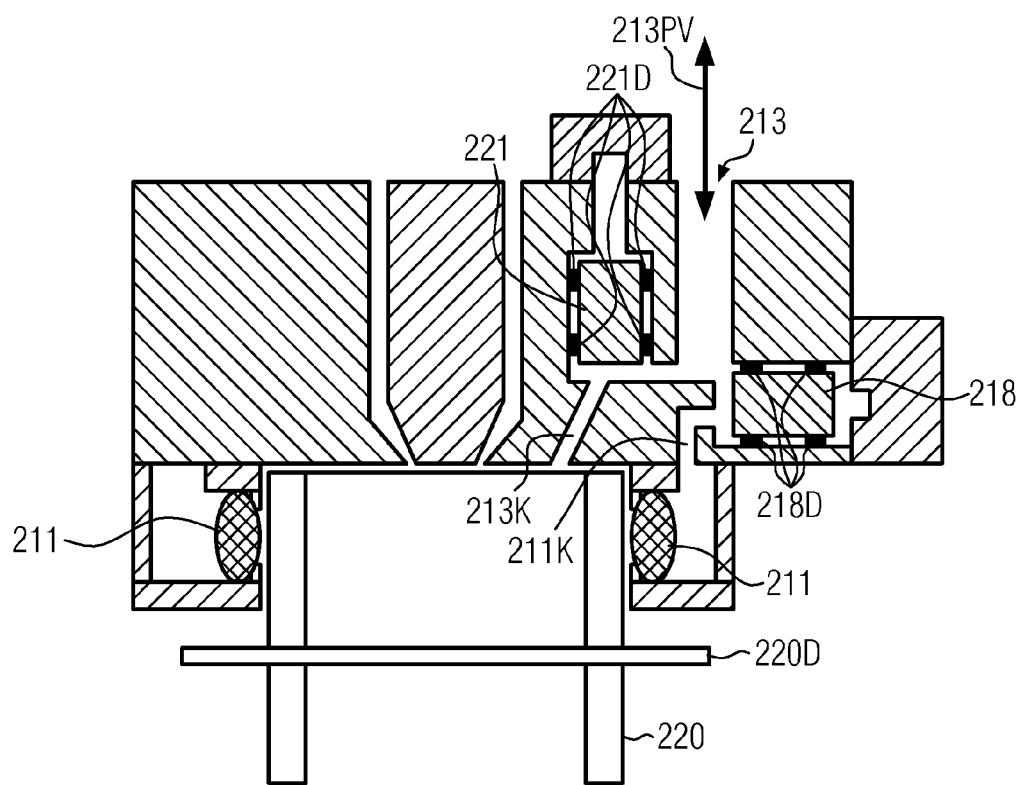
FIG. 16 shows a further development of a processing station/filling station for use in a processing device according to FIG. 13.

FIG. 16 shows a further embodiment of a filling station with a processing element, presently a filling valve 252. FIG. 16 shows in particular a so-called free flow filler for bottles, wherein the pressure for sealing is applied via the $CO_2$-duct. In contrast to FIGS. 15A and 15B as well as 14A and 14B, no separate duct 215 exists via which sealing pressure is applied. Duct 213 for feeding $CO_2$ essentially applies the sealing pressure. The product is again fed via duct 219, as indicated by arrow 219P.

In FIG. 16, movable valves 218 with a valve seal 218D and 221 with a valve seal 221D are indicated. Valves 218 and 221 can be operated pneumatically or electrically, similarly to the valves 281 and 217 in the preceding figures. Valve 218 can close or open duct 211K which is provided for feeding and thereby controlling the substantially radial seal 21. Valve 221 can open or close duct 213K which is provided for feeding the filling gas, $CO_2$. Reference numeral 220D refers to a transport ring of the container.

It should be noted that all the valves for the seals or the vacuum (11, 211, 217, 218) can for affixing the container be automatically closed or opened by the pressure in the feed line. In other words, the pilot valve can act from only one direction upon the valve piston.

FIG. 17 shows a further embodiment of a processing device according to the present disclosure. The processing device 300 can comprise a labeling machine on which a plurality of processing stations or mounts for containers are provided—presently not shown. A feed and removal star 307 is also indicated. The respective direction of rotation of the elements of the processing device 300 designed as a rotary machine are indicated by arrows 305U for the processing wheel/labeling wheel 305 and 307U for the feed and removal star 307. Upstream and downstream stars are indicated by reference numerals 302 and 303. The containers are by the receptacles—presently not shown—passed by labeling stations or aggregates 311 with which a label can be dispensed.

Figure 17A:
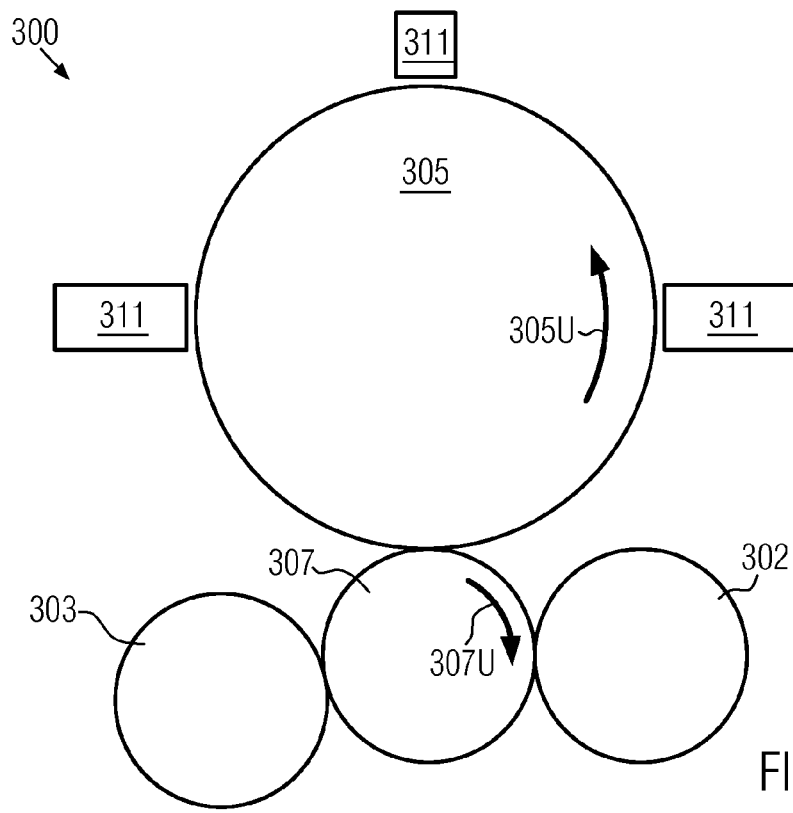
FIG. 17A shows a schematic view of a processing device with processing stations for labeling containers, wherein all elements are embodied in the rotary machine design according to the present disclosure.
Figure 17B:
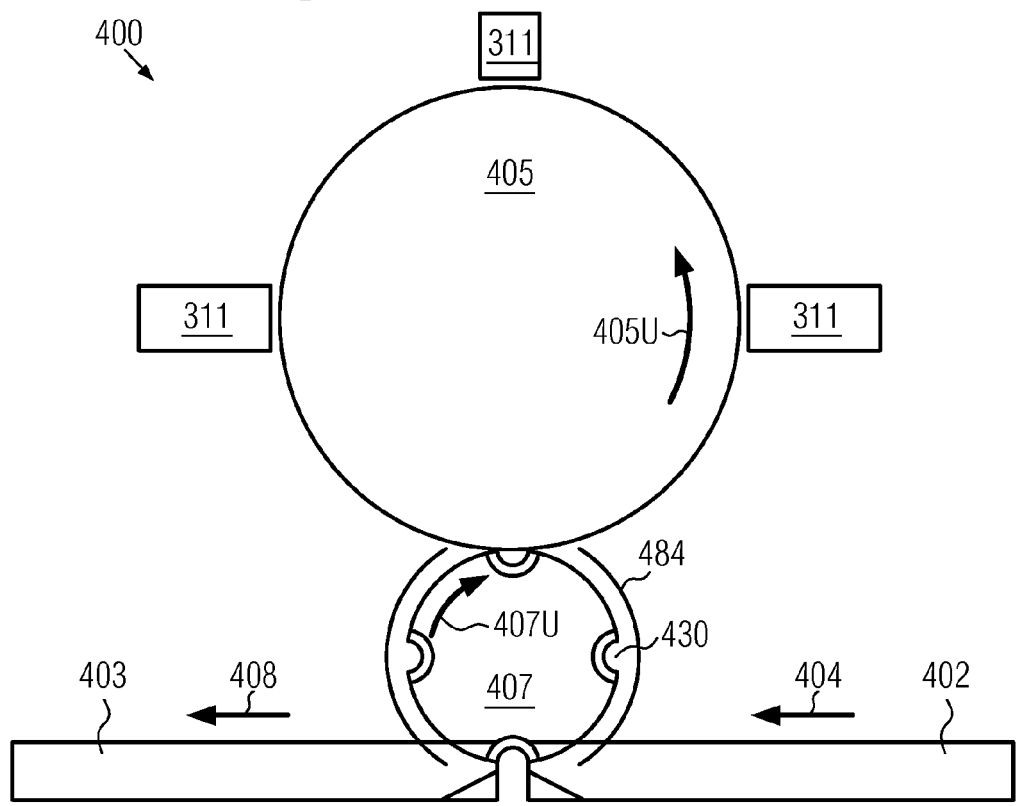
FIG. 17B shows a further embodiment of a processing device for labeling containers according to the present disclosure.

FIG. 17B shows a further embodiment of a labeling machine within the framework of the present disclosure. A processing device 400 for labeling comprises a processing wheel 405. The feed and removal star 407 with its upper pockets 430 (and 431, which are in this perspective covered by pockets 430) and fixed guide rails 484, is also shown. A transport medium, such as a container feed belt, is indicated by reference numeral 402. A container discharge belt is indicated by reference numeral 403. The feed and discharge directions for the containers are indicated by reference numerals 404 and 408. The container discharge belt is typically provided in a different plane than the container feed belt. This is further explained below.

Figure 18A:
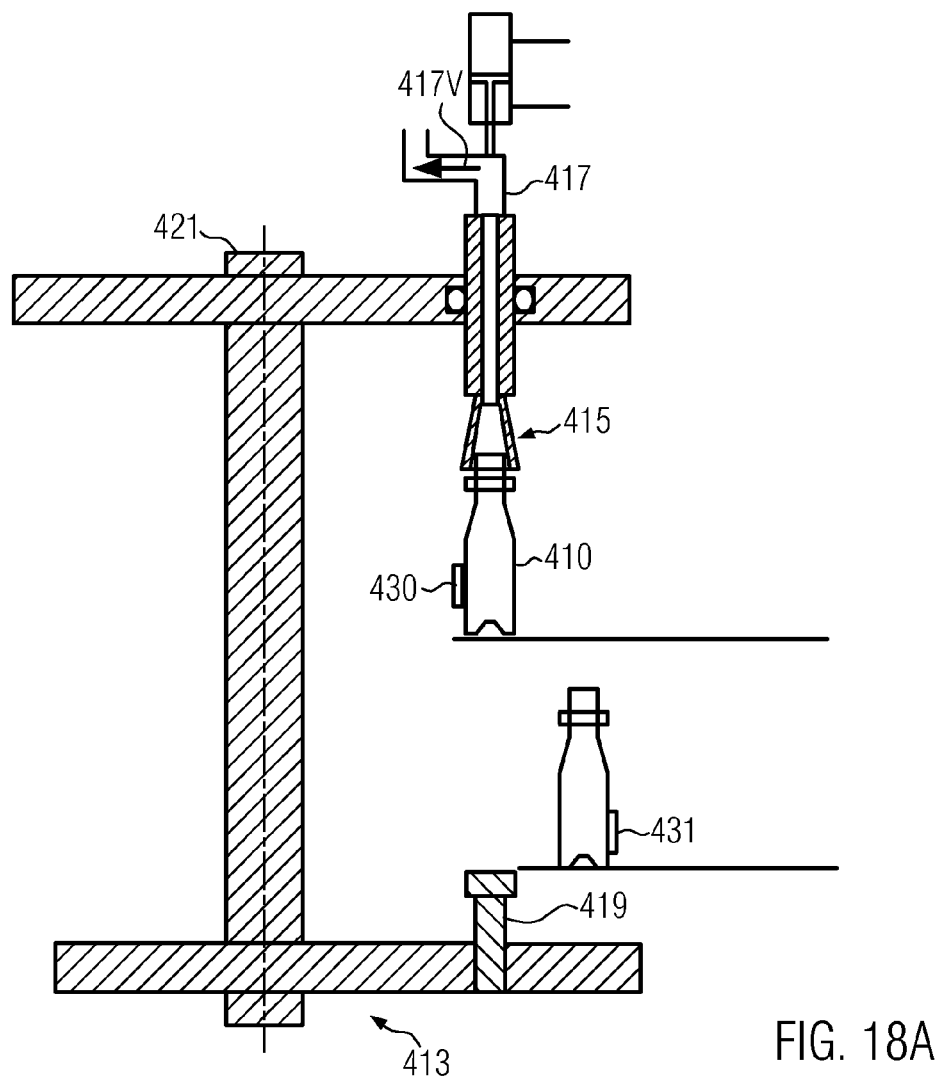
FIG. 18A shows a processing station of a device according to FIG. 17A or 17B according to the present disclosure.

FIG. 18A shows a processing station with a processing element of the processing device as indicated in FIG. 17A or 17B. FIG. 18A indicates a centering device 415 as a processing element for a labeling device. The centering device 415 can center a container 410. Centering of the container 410 occurs between the two carousel members 413 and 421 The centering device/centering bell 415 can be connected via a duct 417, for example, to a pump, such as a vacuum pump, presently not shown. This is indicated by arrow 417V. Due to the negative pressure, it can again be ensured that the container 410 to be labeled can be guided by the centering bell. Furthermore, FIG. 18A shows a lower drive 419 indicating a substantially vertically adjustable base member for mounting the bottle 410. The centering bell can alternatively comprise a gripper device or a seal or a clamp, presently not shown.

Figure 18B:
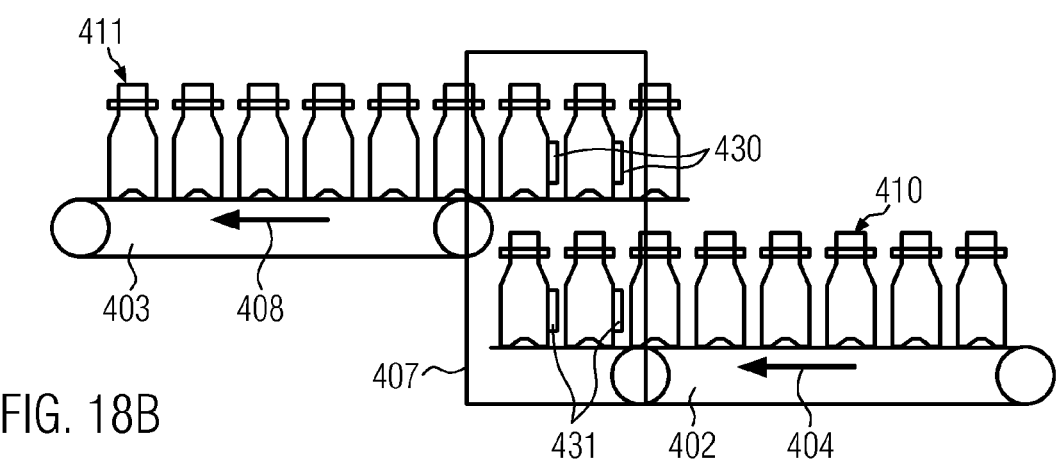
FIG. 18B shows a schematic representation of the transport of containers to a feed star of a device according to FIG. 17B according to the present disclosure.

FIG. 18B, in the area of the feed and removal star 407, shows that the containers 410 to be labeled and the already labeled containers 411 are with conveyor belts 402 and 403 fed and removed at different levels. The directions of movement of the conveyor belts are illustrated by arrows 404 and 408. FIG. 18B indicates gripper elements 430 and 431 at the feed and removal star 407. Similarly as in FIG. 2 and in FIGS. 5 to 9, feeding and removing the containers to be processed, presently to be labeled, and the processed, presently labeled containers are shown offset in height. The gripper elements 430 shown at the top in this schematic representation are therefore shown in a plane which is offset in height relative to the plane in which the gripper elements 431 are arranged, presently shown at the bottom. The feed and removal star 407 is presently preferably a pocket star wheel, on which both the lower grippers or pockets 431, respectively, as well as the upper grippers 430 or pockets, respectively, are arranged.

In an embodiment not shown, it is in particular possible in this manner to perform labeling with a stretchable tubular label. In this, the tubular label is fed to a plurality of fingers of the machine co-rotating in the circumferential direction which are arranged in the upper level within the carousel. After introducing the bottle into the lower level of the labeling machine, the label is stretched radially outwardly by the fingers. The bottle is then conveyed to the upper level of the machine with a plate underneath the bottle so that it is located radially within the stretched label. It is preferably held at the top by a clamp or a mandrel so that the plate can again be lowered. In a further step, the fingers being located between the bottle and the label are drawn off, which can be performed with an element that is fixed in relation to the bottle body, while the label is simultaneously held on to. The stretchable label then tightens around the bottle body. After the labeling is thus performed, the processed bottle, which is still located in the upper level of the machine, is again removed by the feed and removal star.

It is understood that the concept of the present disclosure for removing and moving a container to be processed by a processing device can be transferred to a variety of processing units such as feeding stations, heating chambers, filling stations, labeling stations, sterilization or rinsing stations. With the processing stations according to the disclosure, it is possible to reduce dead space and process containers across typically at least 330° of the revolution of the processing device.

It is understood that the features mentioned in the embodiments described above are not restricted to the specific combinations shown in the figures, but can also be possible in any other combination.

What is claimed is:

1. Processing device comprising a processing wheel which is continuously driven, at least one processing station for processing containers, one star for feeding and removing containers into and out of the processing device, the one star having at least two gripper elements for feeding containers to be processed to the processing station and for removing the processed containers from the processing station, the processing station comprising a processing position within the processing station, and the processing station further comprising at least one processing element processing containers and designed to move the fed containers to be processed and/or the processed containers to be removed at least partially out of the processing position and/or into the processing position.

2. The processing device according to claim 1, wherein the processing element comprises a drive, wherein the drive of the processing element is used for movement of the containers.

3. The processing device according to claim 1, wherein the processing element performs a pneumatic process for the containers using a pneumatic device; and wherein the pneumatic device controls affixing the containers to the processing element.

4. The processing device according to claim 1, wherein the at least two gripper elements of the star are arranged substantially in one plane which is substantially parallel to the plane of the processing device, wherein a first gripper element of the at least two gripper elements is associated only with containers to be removed from the processing station and a second of the at least two gripper elements is associated only with containers to be introduced into the processing station.

5. The processing device according to claim 1, wherein the at least two gripper elements of the star are arranged in two vertically offset planes which are each substantially parallel to the plane of the processing device, so that the containers to be processed can be introduced in one of the two vertically offset planes and the processed containers can be removed substantially in the other of the two vertically offset planes.

6. The processing device according to claim 1, wherein the gripper elements can perform a pivoting motion and/or a telescopically linear motion in a plane that is substantially parallel to the plane of the processing device.

7. The processing device according to claim 1, wherein the gripper elements are adjustable in height.

8. The processing device according to claim 6, wherein the motion of the gripper elements are controlled by one or more servo motors or magnetically acting linear motors.

9. The processing device according to claim 1, wherein the processing element comprises a device for blow-molding containers and a blow mold, where the containers fed are performs.

10. The processing device according to claim 9, wherein the processing element comprises a blowing nozzle which comprises a seal radially enclosing the container at least at an upper end thereof, wherein the blowing nozzle is designed to affix the containers by pressure variation to the processing element to move the affixed containers and/or to set them down.

11. The processing device according to claim 9, wherein the processing element comprises a blowing nozzle and a stretching rod, wherein the stretching rod is formed to affix the containers to the stretching rod using pressure variation, to move the affixed containers and/or to set them down.

12. The processing device according to claim 9, wherein movable valves are provided at the blowing nozzle for holding the containers.

13. The processing device according to claim 9, wherein the processing element comprises an at least three-part blow mold with a base member forming an undercut that is designed as being stationary relative to the processing element.

14. The processing device according to claim 1, wherein the processing station comprises a filling station for filling containers.

15. The processing device according to claim 14, wherein the processing element comprises a filling valve that comprises a seal radially enclosing the container at least at an upper end thereof, wherein the container can be affixed to the filling valve by pressure variation in the filling valve, wherein the affixed container can be moved and/or set down using the filling valve.

16. The processing device according to claim 15, wherein the processing element additionally comprises a vacuum pump, wherein the container is additionally one of affixed, moved, set down, or a combination thereof using pressure variation of the vacuum pump.

17. The processing device according to claim 15, wherein the processing element additionally comprises a clamping device for gripping the containers.

18. The processing device according to claim 1, wherein the processing station comprises a labeling station, wherein the processing element comprises a centering bell that is connected to a vacuum pump and/or a clamping device for gripping the containers such that the containers can be one of affixed, moved, set down, and a combination thereof.

19. A method for processing containers with a processing device having a processing wheel which is continuously driven, having at least one processing station for processing containers, one star for feeding and removing containers into and out of the processing device, the star having at least two gripper elements for feeding containers to be processed to the processing station and for removing the processed containers from the processing station; the processing station having a processing position within the processing station; the method comprising:

processing a container in a processing element of the processing station;

removing the processed container from and feeding a separate container to be processed into the processing element of the star; and moving at least one of the fed container into the processing position or the container to be removed out of the processing position with the processing element.

20. A method according to claim 19, wherein the processing element comprises a device for blow-molding containers and a blow mold, comprising:

(i) gripping the container to be processed with a gripper element;

(ii) blowing a container from an already introduced container to be processed to form a processed container;

(iii) opening the blow mold and raising the blow-molded container from the opened blow mold using the processing element;

(iv) gripping the blow-molded container with a further, second gripper element and introducing the container to be processed, with a further, first gripper element into the opened blow mold;

(v) closing the blow mold around the introduced container to be processed and releasing the blow-molded container from the processing element; and (vi) removing the introduced container to be processed from the first gripper element and removing the blow-molded container with the second gripper element.

21. The method according to claim 19, wherein the processing station comprises a filling station for filling containers, comprising:

(i) gripping the container to be processed with a first gripper element;

(ii) filling an already introduced container to be processed with a liquid;

(iii) raising the filled container using the processing element;

(iv) gripping the filled container with a further, second gripper element and introducing the container to be processed;

(v) releasing the filled container from the processing element;

(vi) removing the introduced container to be processed from the first gripper element and removing the filled container with the second gripper element.

22. The method according to claim 19, wherein the processing station comprises a labeling station, wherein the processing element comprises a centering bell which is connected to a vacuum pump and/or a clamping device for gripping said containers, comprising:

(i) gripping a container to be processed with a first gripper element;

(ii) labeling an already introduced container to be processed;

(iii) raising said labeled container using the processing element;

(iv) gripping the labeled container with a further, second gripper element and introducing the container to be processed;

(v) releasing the labeled container from the processing element;

(vi) removing the introduced container to be processed from the first gripper element and removing the labeled container with the second gripper element.

23. The processing device of claim 1, and wherein the processing element moves the fed containers to be processed and/or the processed containers to be removed in a vertical or a horizontal direction.

24. The method of claim 19, wherein the moving the fed container into the processing station and/or the removal of the container out of the processing station is in a horizontal or a vertical direction.

25. The method of claim 20, wherein the container to be processed comprises a preform.

26. The method of claim 20, wherein the processed container comprises a bottle.

27. The method of claim 21, wherein the container to be processed comprises a pre-form.

28. The method of claim 21, wherein the already introduced container to be processed is a bottle.

29. The method of claim 21, wherein the liquid comprises a beverage.

\* \* \* \* \*